US012625637B2

(12) United States Patent
Hara et al.

(10) Patent No.: US 12,625,637 B2
(45) Date of Patent: May 12, 2026

(54) COMPUTER SYSTEM, REMOTE COPY CONTROL METHOD, AND REMOTE COPY CONTROL PROGRAM

(71) Applicant: Hitachi Vantara, Ltd., Yokohama (JP)

(72) Inventors: Akihiro Hara, Tokyo (JP); Akira Deguchi, Tokyo (JP); Akiyoshi Tsuchiya, Tokyo (JP)

(73) Assignee: Hitachi Vantara, Ltd., Kanagawa-Ken (JP)

( * ) Notice: Subject to any disclaimer, the term of this patent is extended or adjusted under 35 U.S.C. 154(b) by 0 days.

(21) Appl. No.: 18/884,449

(22) Filed: Sep. 13, 2024

(65) Prior Publication Data

US 2025/0181264 A1     Jun. 5, 2025

(30) Foreign Application Priority Data

Dec. 4, 2023    (JP) .................................. 2023-204858

(51) Int. Cl.
     *G06F 3/06*          (2006.01)
(52) U.S. Cl.
     CPC ............ *G06F 3/065* (2013.01); *G06F 3/0619* (2013.01); *G06F 3/067* (2013.01)
(58) Field of Classification Search
     CPC ......... G06F 3/065; G06F 3/0619; G06F 3/067

USPC .......................................................... 711/161
See application file for complete search history.

(56) References Cited

U.S. PATENT DOCUMENTS

| | | | |
|---|---|---|---|
| 2011/0219189 A1 | 9/2011 | Arakawa et al. | |
| 2013/0091328 A1* | 4/2013 | Yoshihara ........... | G06F 12/0817 |
| | | | 711/147 |
| 2013/0311721 A1* | 11/2013 | Yoshihara ........... | G06F 12/0817 |
| | | | 711/122 |
| 2016/0259559 A1* | 9/2016 | Jin ........................ | G06F 3/0619 |
| 2019/0163395 A1 | 5/2019 | Ito et al. | |

FOREIGN PATENT DOCUMENTS

| | | |
|---|---|---|
| JP | 2007-264946 A | 10/2007 |
| JP | 2019-101702 A | 6/2019 |

* cited by examiner

*Primary Examiner* — Than Nguyen
(74) *Attorney, Agent, or Firm* — Volpe Koenig

(57) ABSTRACT

In a computer system, a storage system manages a plurality of first volumes that belong to a CTG, a storage system creates a plurality of second volumes in a distributed manner in a plurality of storage nodes, and causes a second journal volume to exist in each of the plurality of storage nodes, the storage system creates first journal volumes each corresponding to the second journal volume, and executes a write order guarantee process of controlling a process for the plurality of first volumes so that journal data is stored in the plurality of first journal volumes while a write order is ensured.

7 Claims, 22 Drawing Sheets

Figures 4, 5:
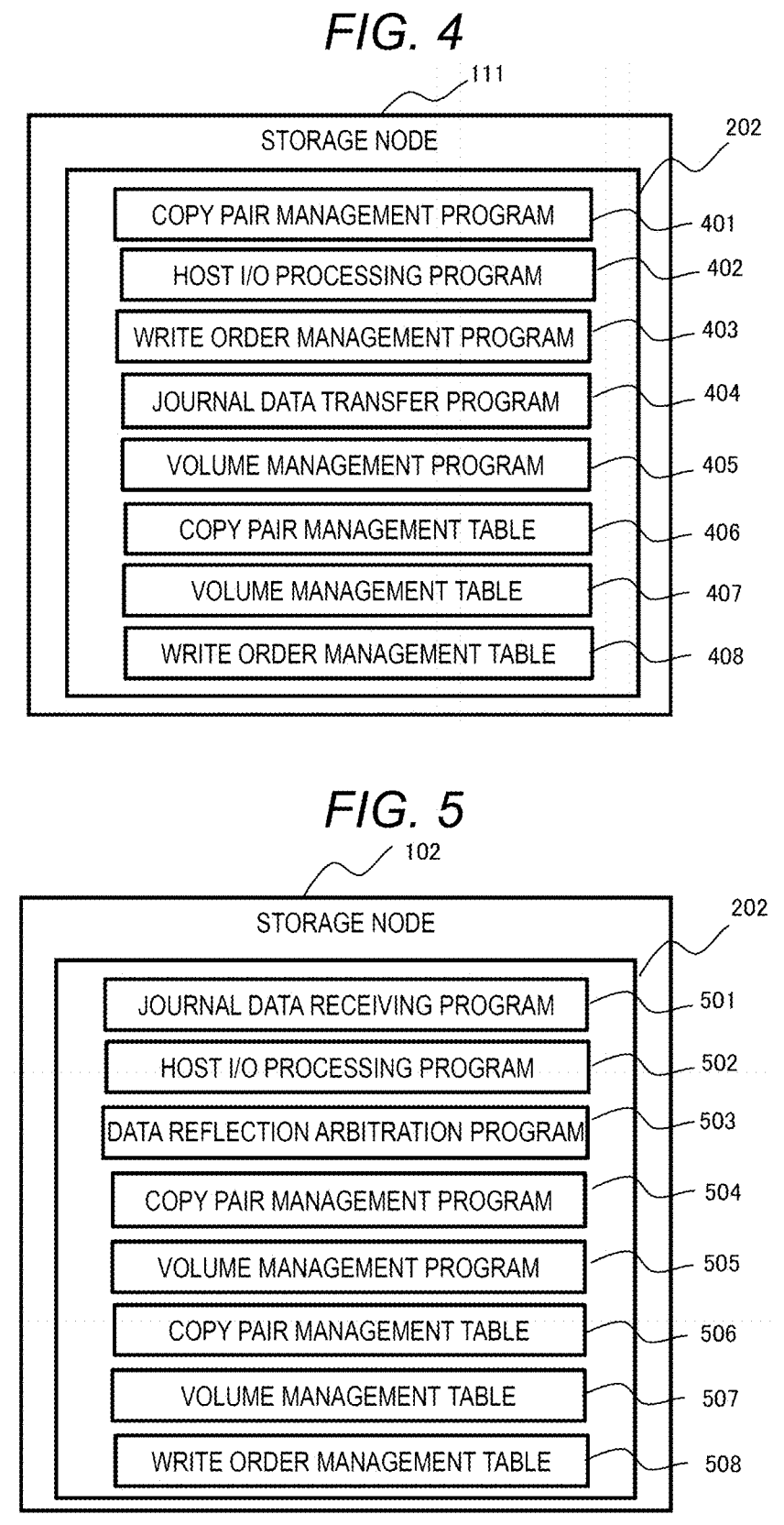

STORAGE NODE                                             202

| COPY PAIR MANAGEMENT PROGRAM | 401 |
| HOST I/O PROCESSING PROGRAM | 402 |
| WRITE ORDER MANAGEMENT PROGRAM | 403 |
| JOURNAL DATA TRANSFER PROGRAM | 404 |
| VOLUME MANAGEMENT PROGRAM | 405 |
| COPY PAIR MANAGEMENT TABLE | 406 |
| VOLUME MANAGEMENT TABLE | 407 |
| WRITE ORDER MANAGEMENT TABLE | 408 |

STORAGE NODE                                             202

| JOURNAL DATA RECEIVING PROGRAM | 501 |
| HOST I/O PROCESSING PROGRAM | 502 |
| DATA REFLECTION ARBITRATION PROGRAM | 503 |
| COPY PAIR MANAGEMENT PROGRAM | 504 |
| VOLUME MANAGEMENT PROGRAM | 505 |
| COPY PAIR MANAGEMENT TABLE | 506 |
| VOLUME MANAGEMENT TABLE | 507 |
| WRITE ORDER MANAGEMENT TABLE | 508 |

FIG. 6

| CTG ID | PRIMARY SYSTEM ID | PRIMARY JOURNAL ID | PRIMARY VOLUME ID | STATE | SECONDARY SYSTEM ID | SECONDARY JOURNAL ID | SECONDARY VOLUME ID | OPERATION MODE | COPY PATH ID |
|---|---|---|---|---|---|---|---|---|---|
| 1 | 1 | 5 | PVOL1 | PAIR | 2 | 5 | SVOL1 | INTRA-NODE | 1 |
| 1 | 1 | 5 | PVOL2 | PAIR | 2 | 5 | SVOL2 | INTRA-NODE | 1 |
| 2 | 1 | 6 | PVOL3 | PAIR | 2 | 6 | SVOL3 | NODE SPANNING | 3 |
| 2 | 1 | 7 | PVOL4 | PAIR | 2 | 7 | SVOL4 | NODE SPANNING | 4 |

FIG. 7

| VOLUME ID | VOLUME ATTRIBUTE | MAXIMUM CAPACITY | DATA STORAGE DESTINATION STORAGE DEVICE | WRITE I/O RESTRICTION FLAG |
|---|---|---|---|---|
| 1 | NORMAL | 100GB | STORAGE DEVICE 1 | OFF |
| 2 | NORMAL | 100GB | STORAGE DEVICE 2 | OFF |
| 3 | NORMAL | 100GB | STORAGE DEVICE 3 | ON |
| 4 | NORMAL | 100GB | STORAGE DEVICE 4 | ON |
| 5 | JOURNAL | 100GB | STORAGE DEVICE 5 | OFF |
| 6 | JOURNAL | 100GB | STORAGE DEVICE 6 | OFF |
| 7 | JOURNAL | 100GB | STORAGE DEVICE 7 | OFF |

FIG. 8

| ID | CTG ID | TIME INFORMATION (GENERATION NUMBER) | WRITE TARGET VOLUME ID | WRITE ADDRESS | JOURNAL VOLUME ID | ADDRESS ON JOURNAL VOLUME | REFLECTION STATUS |
|---|---|---|---|---|---|---|---|
| 1 | 1 | 1 | 1 | 0~255 | 5 | 0~255 | TRANSFERRED |
| 2 | 1 | 1 | 2 | 0~255 | 5 | 256~511 | TRANSFERRED |
| 3 | 2 | 1 | 2 | 256~511 | 5 | 512~767 | TRANSFERRED |
| 4 | 2 | 1 | 3 | 0~255 | 6 | 0~255 | NOT TRANSFERRED |
| 5 | 1 | 1 | 1 | 256~511 | 5 | 768~1023 | NOT TRANSFERRED |
| 6 | 2 | 1 | 4 | 0~255 | 7 | 0~255 | NOT TRANSFERRED |
| 7 | 1 | 2 | 1 | 0~255 | 5 | 1024~1279 | NOT TRANSFERRED |
| 8 | 2 | 2 | 4 | 0~255 | 7 | 256~511 | NOT TRANSFERRED |

| VOLUME ID | VOLUME ATTRIBUTE | MAXIMUM CAPACITY | VOLUME STORAGE NODE | DATA STORAGE DESTINATION STORAGE DEVICE | WRITE I/O RESTRICTION FLAG |
|---|---|---|---|---|---|
| 1 | NORMAL | 100GB | 1 | STORAGE DEVICE 1 | ON |
| 2 | NORMAL | 100GB | 1 | STORAGE DEVICE 2 | ON |
| 3 | NORMAL | 100GB | 2 | STORAGE DEVICE 3 | ON |
| 4 | NORMAL | 100GB | 3 | STORAGE DEVICE 4 | ON |
| 5 | JOURNAL | 100GB | 1 | STORAGE DEVICE 5 | ON |
| 6 | JOURNAL | 100GB | 2 | STORAGE DEVICE 6 | ON |
| 7 | JOURNAL | 100GB | 3 | STORAGE DEVICE 7 | ON |

FIG. 10

| ID | CTG ID | TIME INFORMATION (GENERATION NUMBER) | WRITE TARGET VOLUME ID | WRITE ADDRESS | JOURNAL VOLUME ID | ADDRESS ON JOURNAL VOLUME | REFLECTION STATUS |
|---|---|---|---|---|---|---|---|
| 1 | 1 | 1 | 1 | 0~255 | 5 | 0~255 | NOT REFLECTED |
| 2 | 1 | 1 | 2 | 0~255 | 5 | 256~511 | NOT REFLECTED |
| 3 | 2 | 1 | 2 | 256~511 | 5 | 512~767 | NOT REFLECTED |
| 4 | 2 | 1 | 3 | 0~255 | 6 | 0~255 | NOT REFLECTED |
| 5 | 1 | 1 | 1 | 256~511 | 5 | 768~1023 | NOT REFLECTED |
| 6 | 2 | 1 | 4 | 0~255 | 7 | 0~255 | NOT REFLECTED |
| 7 | 1 | 2 | 1 | 0~255 | 5 | 1024~1279 | NOT REFLECTED |

Figure 12:
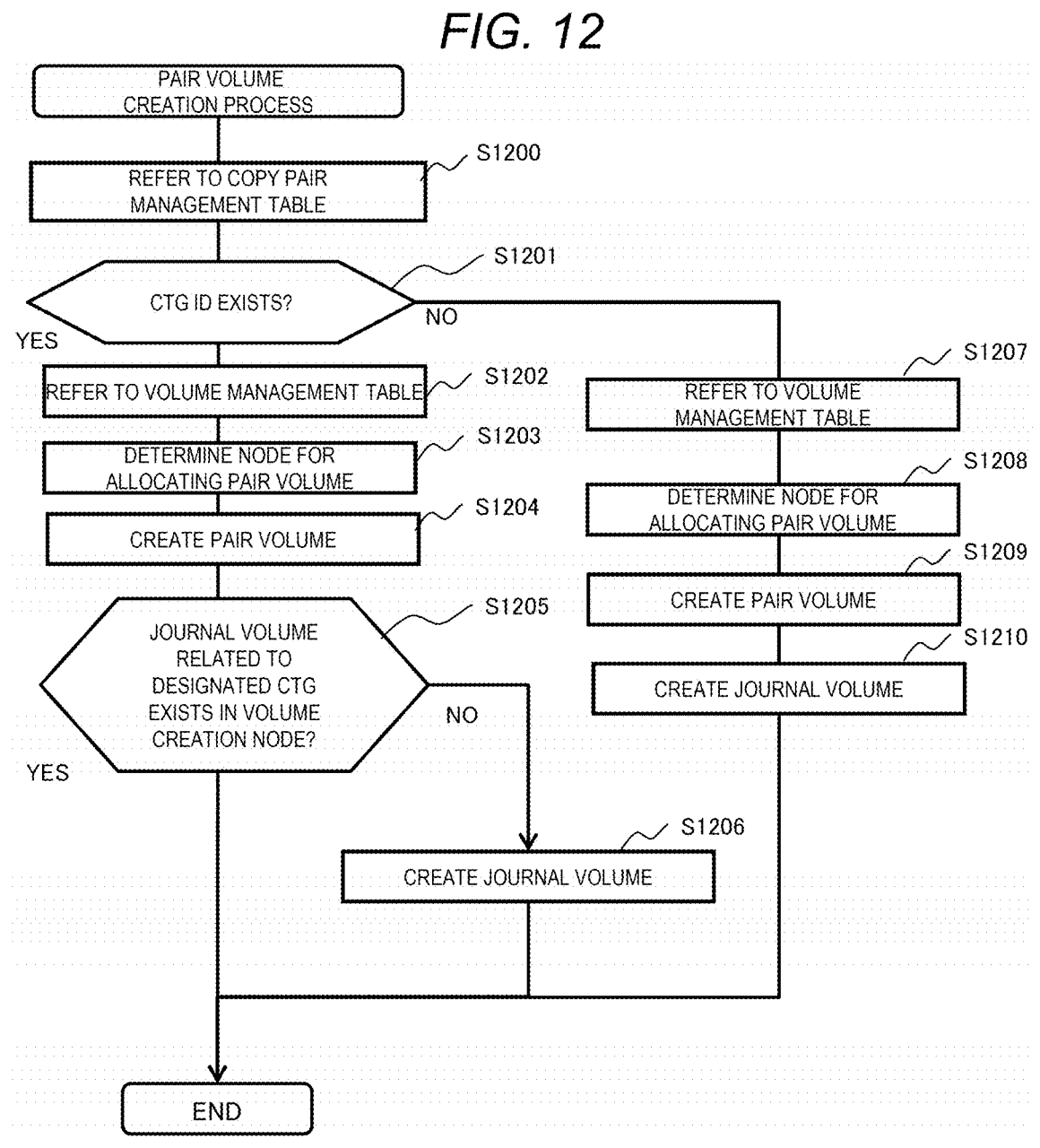

```
        ┌─────────────────────────┐
        │      PAIR VOLUME        │
        │   CREATION PROCESS      │
        └─────────────────────────┘
                    │
                    │              S1200
        ┌─────────────────────────┐
        │   REFER TO COPY PAIR    │
        │   MANAGEMENT TABLE      │
        └─────────────────────────┘
                    │
                    │              S1201
              ╱─────────────╲        NO
        ╱─────  CTG ID EXISTS? ─────────────────────────────┐
  YES   ╲─────────────────────╱                             │
                    │                                        │
        ┌─────────────────────────┐  S1202          ┌──────────────────────┐  S1207
        │REFER TO VOLUME MANAGEMENT TABLE│            │   REFER TO VOLUME    │
        └─────────────────────────┘                  │  MANAGEMENT TABLE    │
                    │              S1203              └──────────────────────┘
        ┌─────────────────────────┐                         │
        │   DETERMINE NODE FOR    │                  ┌──────────────────────┐  S1208
        │ ALLOCATING PAIR VOLUME  │                  │  DETERMINE NODE FOR  │
        └─────────────────────────┘                  │ ALLOCATING PAIR VOLUME│
                    │              S1204              └──────────────────────┘
        ┌─────────────────────────┐                         │
        │    CREATE PAIR VOLUME   │                  ┌──────────────────────┐  S1209
        └─────────────────────────┘                  │  CREATE PAIR VOLUME  │
                    │                                 └──────────────────────┘
            ╱───────────────╲       S1205                    │
           ╱ JOURNAL VOLUME  ╲                       ┌──────────────────────┐  S1210
          ╱   RELATED TO      ╲   NO                 │ CREATE JOURNAL VOLUME│
         │   DESIGNATED CTG    │──────┐              └──────────────────────┘
          ╲  EXISTS IN VOLUME  ╱      │                      │
           ╲ CREATION NODE?   ╱       │                      │
            ╲───────────────╱         │                      │
  YES            │                    ▼    S1206             │
                 │          ┌──────────────────────┐        │
                 │          │ CREATE JOURNAL VOLUME│        │
                 │          └──────────────────────┘        │
                 │                    │                      │
                 │                    └──────────────────────┤
                 │                                           │
                 └───────────────────────────────────────────
                 │
          ┌─────────────┐
          │     END     │
          └─────────────┘
```

FIG. 17

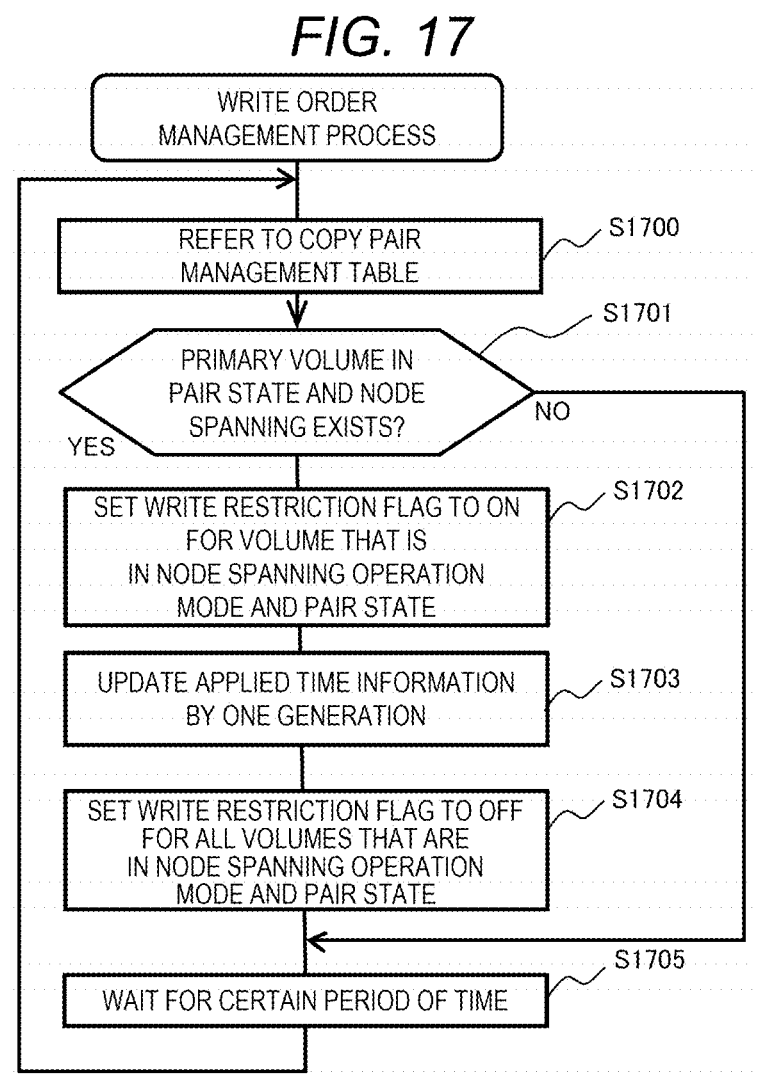

```
┌─────────────────────────────┐
│      WRITE ORDER            │
│   MANAGEMENT PROCESS        │
└─────────────────────────────┘
              │
    ┌─────────▼───────────────┐
    │                         │
    │   ┌─────────────────────────────┐   S1700
    │   │   REFER TO COPY PAIR        │ ⟋
    │   │   MANAGEMENT TABLE          │
    │   └─────────────────────────────┘
    │                 │
    │                 ▼                      S1701
    │          ╱─────────────────╲        ⟋
    │         ╱  PRIMARY VOLUME IN  ╲
    │        ╱   PAIR STATE AND NODE  ╲────────── NO ───┐
    │        ╲   SPANNING EXISTS?    ╱                   │
    │      YES ╲─────────────────╱                       │
    │                 │                                   │
    │                 ▼                      S1702        │
    │   ┌─────────────────────────────┐  ⟋               │
    │   │  SET WRITE RESTRICTION FLAG │                   │
    │   │   TO ON FOR VOLUME THAT IS  │                   │
    │   │  IN NODE SPANNING OPERATION │                   │
    │   │     MODE AND PAIR STATE     │                   │
    │   └─────────────────────────────┘                   │
    │                 │                                   │
    │                 ▼                      S1703        │
    │   ┌─────────────────────────────┐  ⟋               │
    │   │  UPDATE APPLIED TIME INFORMATION │              │
    │   │     BY ONE GENERATION       │                   │
    │   └─────────────────────────────┘                   │
    │                 │                                   │
    │                 ▼                      S1704        │
    │   ┌─────────────────────────────┐  ⟋               │
    │   │ SET WRITE RESTRICTION FLAG TO OFF │             │
    │   │   FOR ALL VOLUMES THAT ARE  │                   │
    │   │  IN NODE SPANNING OPERATION │                   │
    │   │     MODE AND PAIR STATE     │                   │
    │   └─────────────────────────────┘                   │
    │                 │                                   │
    │                 ◄───────────────────────────────────┘
    │                 │                      S1705
    │   ┌─────────────────────────────┐  ⟋
    │   │ WAIT FOR CERTAIN PERIOD OF TIME │
    │   └─────────────────────────────┘
    │                 │
    └─────────────────┘
```

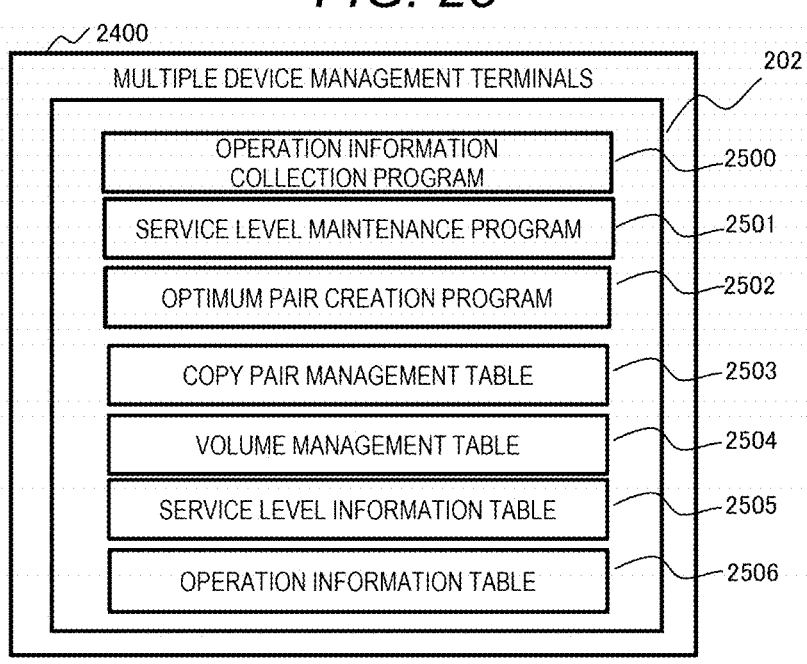

2400

MULTIPLE DEVICE MANAGEMENT TERMINALS — 202

- OPERATION INFORMATION COLLECTION PROGRAM — 2500
- SERVICE LEVEL MAINTENANCE PROGRAM — 2501
- OPTIMUM PAIR CREATION PROGRAM — 2502
- COPY PAIR MANAGEMENT TABLE — 2503
- VOLUME MANAGEMENT TABLE — 2504
- SERVICE LEVEL INFORMATION TABLE — 2505
- OPERATION INFORMATION TABLE — 2506

| SYSTEM ID | NODE ID | TIME | CPU OPERATION RATE [%] | USABLE CAPACITY [TB] |
|-----------|---------|-------|------------------------|----------------------|
| 1 | - | 10:00 | 50 | 20 |
| 2 | 1 | 10:00 | 45 | 10 |
| 2 | 2 | 10:00 | 60 | 5 |
| 2 | 3 | 10:00 | 50 | 20 |

| SYSTEM ID | VOLUME ID | RPO | MAXIMUM CAPACITY |
|-----------|-----------|-----|------------------|
| 1 | 1 | 1Minutes | 500GB |
| 1 | 2 | 1Minutes | 750GB |
| 1 | 3 | 5Minutes | 500GB |
| 1 | 4 | 5Minutes | 500GB |

FIG. 28

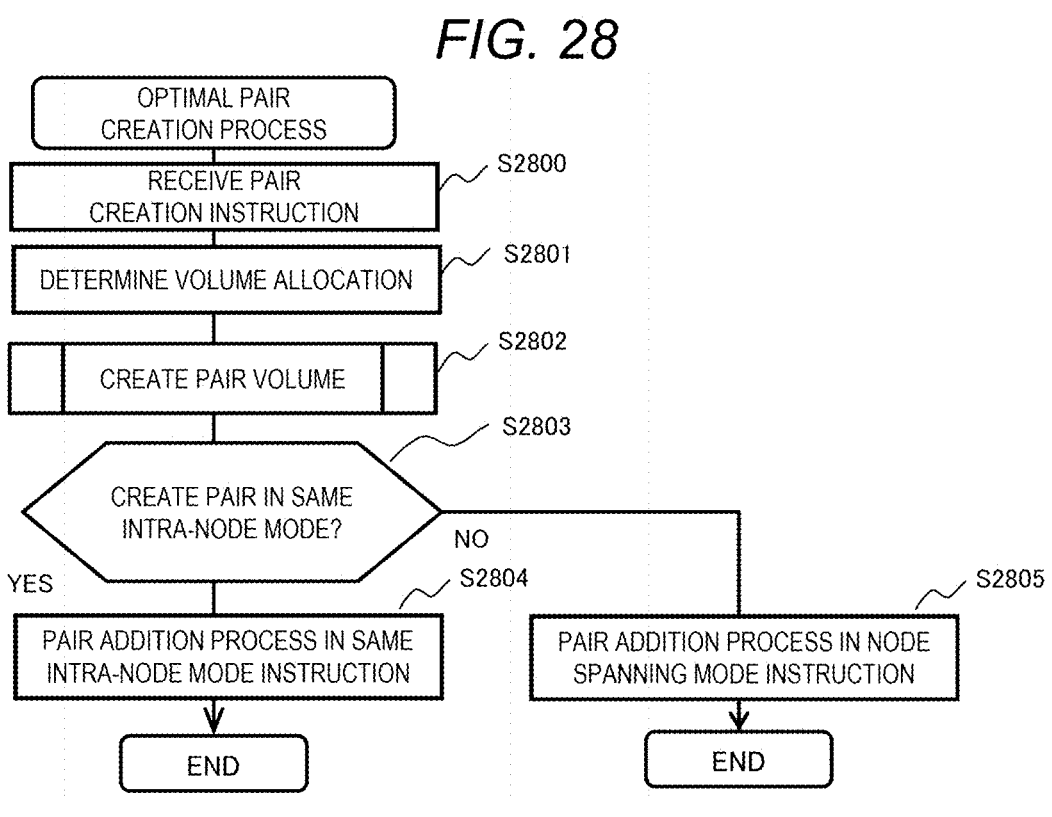

OPTIMAL PAIR
CREATION PROCESS

RECEIVE PAIR
CREATION INSTRUCTION — S2800

DETERMINE VOLUME ALLOCATION — S2801

CREATE PAIR VOLUME — S2802

S2803
CREATE PAIR IN SAME
INTRA-NODE MODE?

YES NO

S2804

PAIR ADDITION PROCESS IN SAME
INTRA-NODE MODE INSTRUCTION

S2805

PAIR ADDITION PROCESS IN NODE
SPANNING MODE INSTRUCTION

END

END

FIG. 29

CREATE PAIR VOLUME

REFER TO COPY PAIR
MANAGEMENT TABLE — S2900

CTG ID EXISTS? — S2901

YES NO

INSTRUCT TO CREATE PAIR VOLUME — S2902

INSTRUCT TO CREATE PAIR VOLUME — S2905

JOURNAL VOLUME
RELATED TO
DESIGNATED CTG
EXISTS IN VOLUME
CREATION NODE? — S2903

INSTRUCT TO CREATE
JOURNAL VOLUME — S2906

YES NO

JOURNAL VOLUME
CREATION INSTRUCTION — S2904

END

END

END

COMPUTER SYSTEM, REMOTE COPY CONTROL METHOD, AND REMOTE COPY CONTROL PROGRAM

BACKGROUND OF THE INVENTION

1. Field of the Invention

The present invention relates to a data copy technology between storage systems.

2. Description of Related Art

A technique of copying data between storage systems is known. For example, PTL 1 discloses a method for guaranteeing an update order of data spanning devices by determining points where data can be updated in the devices based on write order information in asynchronous remote copy between a plurality of storage devices.

PTL 2 discloses a method in which, in a distributed storage system including a plurality of storage nodes, in order to maintain response performance while ensuring redundancy of data, an I/O process is shared and executed by each node, and a physical area of a certain node is preferentially assigned as a storage area handled by the node.

In a computer system, a consistency group (CTG) which is a range for guaranteeing an order of writing data to a plurality of volumes may be implemented in remote copy from a primary storage system (copy source storage system) to a secondary storage system (copy destination storage system).

CITATION LIST

Patent Literature

PTL 1: JP2007-264946A
PTL 2: JP2019-101702A

SUMMARY OF THE INVENTION

For example, when a volume in the primary storage system is asynchronously remote-copied to the secondary storage system in the computer system, the secondary storage system may be a distributed storage system including a plurality of storage nodes. In this case, volumes that are copy destinations of a plurality of volumes that belong to the same CTG in the primary storage system may be created by being distributed to a plurality of storage nodes.

Thus, when a plurality of volumes that belong to the same CTG in the secondary storage system are distributed to a plurality of storage nodes, it is necessary to create a journal volume for storing data indicating updated contents of the volume for each storage node and to create a corresponding journal volume in the primary storage system, which requires time and effort for a user to set up. When a plurality of volumes that belong to the same CTG in the secondary storage system are distributed to a plurality of storage nodes, it is necessary to execute a process for guaranteeing a data update order for the plurality of volumes that belong to the CTG.

On the other hand, volumes as copy destinations of a plurality of volumes that belong to the same CTG in the primary storage system may be created in one storage node. In this case, the user needs to perform a setting different from a case where a plurality of volumes that belong to the same CTG in the secondary storage system are distributed to a plurality of storage nodes, which becomes a complicated process for the user.

The invention has been made in view of the above circumstances, and an object of the invention is to provide a technique capable of easily and appropriately setting and executing asynchronous remote copy from a copy source storage system to a copy destination secondary storage system including a plurality of storage nodes.

In order to achieve the above object, a computer system according to one aspect is a computer system including: a first storage system; and a second storage system, in which the first storage system manages a plurality of first volumes that belong to a consistency group that guarantees a write order of data, the second storage system has a plurality of storage nodes, the second storage system creates a plurality of second volumes as copy destinations of the plurality of first volumes in a distributed manner in the plurality of storage nodes, and causes a second journal volume to exist in each of the plurality of storage nodes in which the plurality of second volumes are created, the second journal volume storing journal data indicating write contents in the first volume as a copy source of the second volume, and the first storage system creates a plurality of first journal volumes storing journal data for the plurality of first volumes each corresponding to the second journal volume, and executes a write order guarantee process of controlling a process for the plurality of first volumes so that the journal data indicating the write contents to the plurality of first volumes is stored in the plurality of first journal volumes while an order of writing to the plurality of first journal volumes is ensured.

According to the invention, it is possible to easily and appropriately set and execute asynchronous remote copy from a copy source storage system to a copy destination secondary storage system including a plurality of storage nodes.

BRIEF DESCRIPTION OF THE DRAWINGS

FIG. 1 is an overall configuration diagram of a computer system according to a first embodiment;

FIG. 4 is a diagram showing a configuration of a memory of a storage node in a primary storage system according to the first embodiment;

FIG. 5 is a diagram showing a configuration of a memory of a storage node in a secondary storage system according to the first embodiment;

FIG. 6 is a configuration diagram of a copy pair management table according to the first embodiment;

FIG. 7 is a configuration diagram of a volume management table of the primary storage system according to the first embodiment;

FIG. 8 is a configuration diagram of a write order management table of the primary storage system according to the first embodiment;

FIG. 9 is a configuration diagram of a volume management table of the secondary storage system according to the first embodiment;

FIG. 10 is a configuration diagram of a write order management table of the secondary storage system according to the first embodiment;

FIG. 12 is a flowchart of a pair volume creation process according to the first embodiment;

FIG. 17 is a flowchart of a write order management process according to the first embodiment;

FIG. 24 is an overall configuration diagram of a computer system according to a fifth embodiment;

FIG. 25 is a configuration diagram of a memory of multiple device management terminals according to the fifth embodiment;

FIG. 26 is a configuration diagram of an operation information table according to the fifth embodiment;

FIG. 27 is a configuration diagram of a service level information table according to the fifth embodiment;

FIG. 28 is a flowchart of an optimal pair creation process according to the fifth embodiment; and FIG. 29 is a flowchart of a pair volume creation process according to the fifth embodiment.

DESCRIPTION OF EMBODIMENTS

Figures 2, 3:
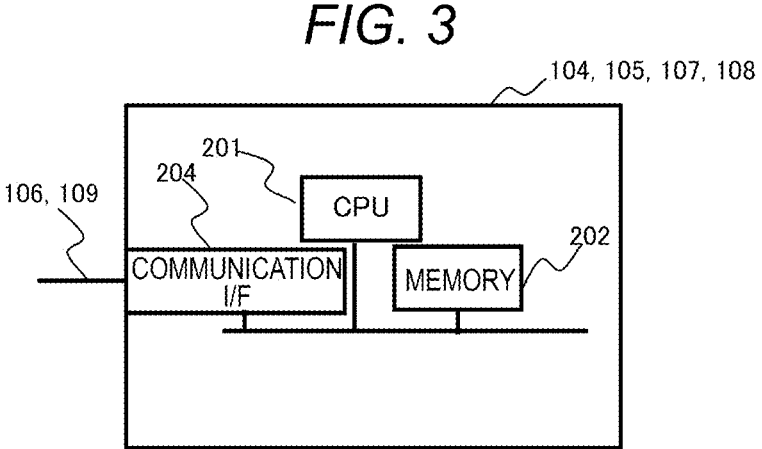
FIG. 2 is a configuration diagram of a storage node according to the first embodiment.
FIG. 3 is a configuration diagram of a host computer and a management terminal according to the first embodiment.

Embodiments will be described with reference to the drawings. The embodiments to be described later do not limit the invention according to the claims, and all of the various elements described in the embodiments and the combinations thereof are not necessarily essential for the solution of the invention.

In the following description, information may be described by an expression of "AAA table", and the information may be expressed in any data structure. That is, in order to indicate that the information does not depend on the data structure, the "AAA table" can be referred to as "AAA information".

In the following description, a configuration of each table is an example. One table may be divided into two or more tables, or all or some of two or more tables may be one table.

In the following description, a process may be described using a "program" as a subject of an operation, but since the program is executed by a processor (for example, a central processing unit (CPU)), a predetermined process is appropriately executed using a memory or a communication I/F. Therefore, the subject of the operation of the process may be a processor (or a device such as a controller or a computer including the processor).

The program may be installed in a device such as a computer from a program source. The program source may be, for example, a program distribution server or a computer-readable (for example, non-transitory) recording medium. In the following description, two or more programs may be implemented as one program, or one program may be implemented as two or more programs.

In the following description, when elements of the same type are described without being distinguished, a reference sign may be used, and when elements of the same type are distinguished and described, ID of the element (for example, identification numbers) may be used. For example, when storage nodes are described without being distinguished, the storage nodes are described as "storage node 102", and when individual nodes are distinguished and described, the individual nodes may be described as "storage node 1" and "storage node 2". In the following description, by adding n to a name of an element in the storage node n (n is a natural number), it is also possible to distinguish which node the element belongs to.

Hereinafter, an embodiment of the invention will be described with reference to the drawings. The invention is not limited to the following embodiments.

First Embodiment

Figure 1:
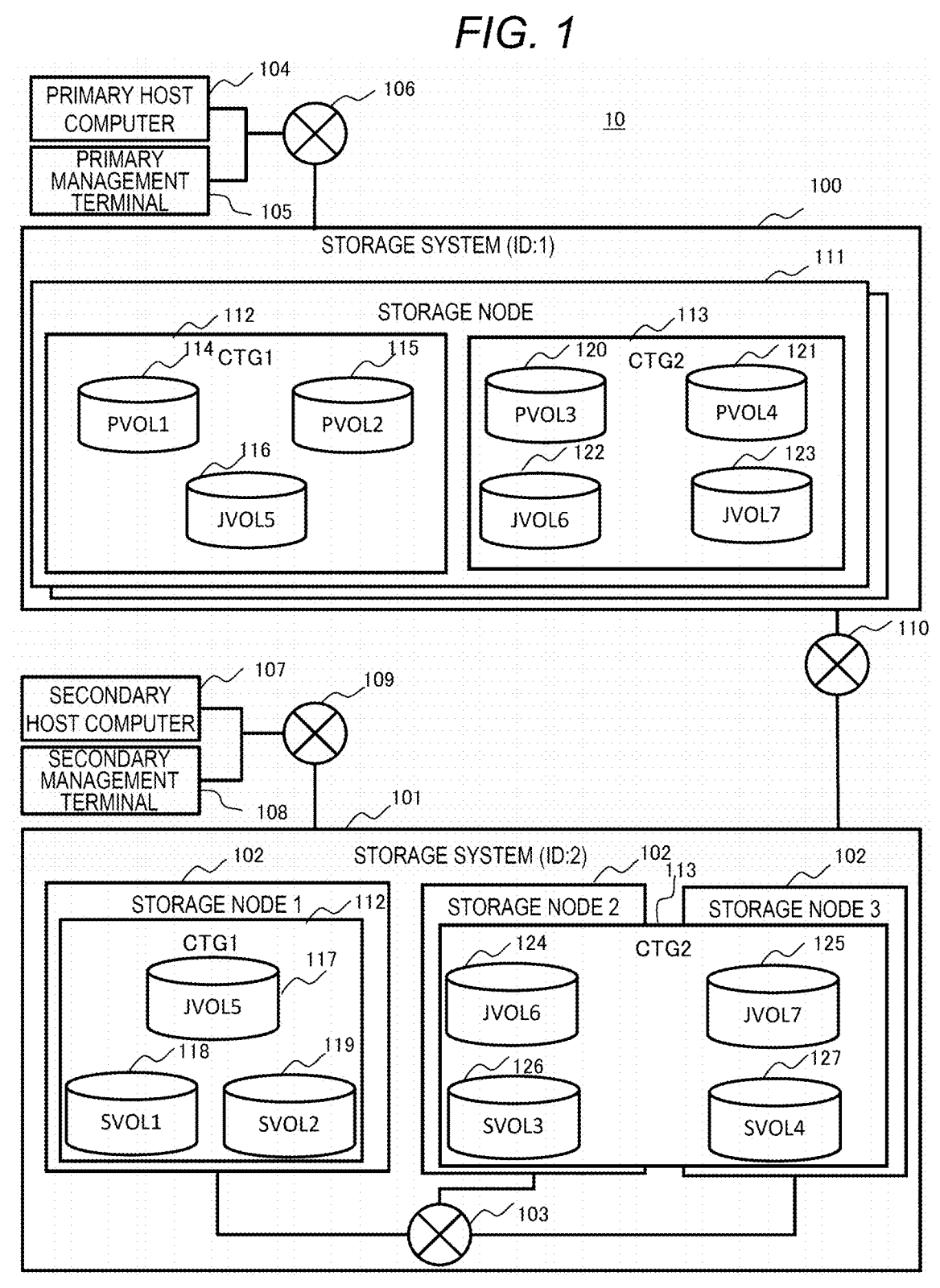

FIG. 1 is an overall configuration diagram of a computer system according to a first embodiment.

A computer system 10 includes a storage system 100, a primary host computer 104, a primary management terminal 105, a storage system 101, a secondary host computer 107, and a secondary management terminal 108.

The storage system 100 and the storage system 101 are connected via an inter-storage system network 110. The inter-storage system network 110 is a network such as a wired local area network (LAN), a wireless LAN, or a wide area network (WAN), and may be, for example, a network using Ethernet (registered trademark) or Fibre Channel.

The storage system 100, the primary host computer 104, and the primary management terminal 105 are connected via a primary network 106. In the present embodiment, a range connected to the primary network 106 is called a primary system, and each component is treated as a primary configuration. The primary network 106 is, for example, a LAN.

The storage system 100 is an example of a first storage system, and includes one or more storage nodes 111. The storage node 111 is an example of a computer and provides a plurality of volumes. The storage nodes 111 are provided for redundancy, and in the storage system 100, operate as one storage node as a whole.

The primary host computer 104 executes an application or the like and executes various processes accompanied by an I/O request to the storage system 100. The primary management terminal 105 issues an instruction such as volume creation to the storage system 100 to manage the storage system 100.

The storage system 101, the secondary host computer 107, and the secondary management terminal 108 are connected via a secondary network 109. In the present embodiment, a range connected to the secondary network 109 is called a secondary system, and each component is treated as a secondary configuration. The secondary network 109 is, for example, a LAN.

The storage system 101 is an example of a second storage system, and includes a plurality of storage nodes 102. In the present embodiment, the storage system 101 is a distributed storage system such as a scale-out storage system including the plurality of storage nodes 102 communicably connected via an inter-node network 103, and performs an operation in cooperation as one cluster to provide a plurality of volumes.

The secondary host computer 107 executes an application or the like and executes various processes accompanied by an I/O request to the storage system 101. The secondary management terminal 108 issues an instruction such as volume creation to the storage system 101 to manage the storage system 101.

In the computer system 10, one or both of the primary system and the secondary system may be operated in a cloud.

In the present embodiment, it is assumed that data written by the primary host computer 104 in the primary storage system 100 is remote-copied to the secondary storage system 101 for disaster recovery and backup, and when a failure occurs in the primary system or the like, the secondary host computer 107 performs a restoration process based on the data stored in the storage system 101 in the secondary system to resume a process.

An example of a configuration of a pair (copy pair) of a copy source volume and a copy destination volume related to remote copy in the present embodiment will be described. The copy pair is implemented by a pair creation process (see FIG. 11) to be described later.

In the example in FIG. 1, a system ID of the storage system 100 is set to 1, and a system ID of the storage system 101 is set to 2. The storage system 101 includes three storage nodes, a storage node 102 having ID 1 (storage node 1), a storage node 102 having ID 2 (storage node 2), and a storage node 102 having ID 3 (storage node 3).

In the computer system 10, a consistency group (CTG) indicating a range for guaranteeing a write order of data among a plurality of volumes is managed when data is reflected in the secondary system by remote copy. Each copy pair is managed so as to belong to one of the CTGs. Specifically, the computer system 10 includes a CTG 112 (CTG1) and a CTG 113 (CTG2). The same CTG (112, 113) is assigned the same ID in the storage systems 100 and 101.

In the CTG1, in the primary storage system 100, PVOLs (primary volumes), which are a PVOL 114 (PVOL1) and a PVOL 115 (PVOL2), exist as volumes for which the primary host computer 104 executes an I/O process. In the storage system 100, when a write I/O request is issued to the PVOL 114, 115, a JVOL 116 (JVOL5) exists as a journal volume (JVOL) which is a volume for storing differential data (journal data) indicating write contents to be used for remote copy to the secondary storage system 101, which is asynchronous with the I/O process to the PVOL.

In the secondary storage system 101, a JVOL 117 (JVOL5), which is a volume that is paired with the JVOL 116 (JVOL5) in the storage system 100 and receives and temporarily stores the differential data that is remotely copied, exists in the storage node 1. In the storage node 1, SVOLs (secondary volumes), which are an SVOL 118 (SVOL1) and an SVOL 119 (SVOL2), exist as copy destinations of the PVOL 114 and the PVOL 115, and as target volumes onto which the differential data stored in the JVOL 117 is reflected.

In the CTG1, in the secondary storage system 101, the SVOL exists in one storage node and is not distributed to a plurality of storage nodes (does not span storage nodes). Therefore, the computer system 10 operates in a mode of guaranteeing the write order of data by using only one JVOL to reflect data to a plurality of SVOLs.

In the CTG2, in the primary storage system 100, a PVOL 120 (PVOL3) and a PVOL 121 (PVOL4) exist as volumes for which the primary host computer 104 executes an I/O process. In the storage system 100, when a write I/O request is issued to the PVOL 120, a JVOL 122 (JVOL6) exists as a JVOL which is a volume for storing differential data used for remote copy to the secondary storage system 101, which is asynchronous with the I/O process to the PVOL 120. In the storage system 100, when a write I/O request is issued to the PVOL 121, a JVOL 123 (JVOL7) exists as a JVOL which is a volume for storing differential data used for remote copy to the secondary storage system 101, which is asynchronous with the I/O process to the PVOL 121.

In the secondary storage system 101, a JVOL 124 (JVOL6), which is a volume that is paired with the JVOL 122 (JVOL6) in the storage system 100 and receives and temporarily stores the differential data that is remotely copied, exists in the storage node 2. In the storage node 2, a SVOL 126 (SVOL3) exists as a copy destination of the PVOL 120 (PVOL3), and as a target volume onto which the differential data stored in the JVOL 124 is reflected. A JVOL 125 (JVOL7), which is a volume that is paired with the JVOL 123 (JVOL7) in the storage system 100 and receives and temporarily stores the differential data that is remotely copied, exists in the storage node 3. In the storage node 3, a SVOL 127 (SVOL4) exists as a copy destination of the PVOL 121 (PVOL4), and as a target volume onto which the differential data stored in the JVOL 125 is reflected.

Since the secondary JVOL does not execute a data reflection process on the SVOL spanning the storage node 102, a plurality of JVOLs are prepared in the primary storage system 100 and the secondary storage system 101 in the CTG2 spanning the storage node 2 and the storage node 3, and the computer system 10 executes a process for guaranteeing a write order of data spanning a plurality of JVOLs.

In the computer system 10 according to the present embodiment, in an environment in which an environment for guaranteeing the write order limited to the storage node as in the CTG1 and an environment for guaranteeing the write order spanning the storage nodes as in the CTG2 are mixed, an operation method performed by a user can be facilitated (for example, similar as in a case where such environments are not mixed).

Next, a configuration of the storage node 111, 102 will be described.

FIG. 2 is a configuration diagram of the storage node according to the first embodiment. Since the storage nodes 111 and 102 have a similar configuration, for convenience, the description will be given with reference to FIG. 2.

The storage node 111 (102) is an example of a computer, and includes a CPU 201 as an example of a processor, a memory 202 as an example of a storage unit, a storage device 203, and a communication (interface) I/F 204. These components 201 to 204 are connected to each other via an internal bus or the like so as to be able to communicate with each other. There may be one or more of each of the CPU 201, the memory 202, the storage device 203, and the communication I/F 204.

The CPU 201 controls an overall operation of the storage node 111 (102). The CPU 201 executes various processes based on programs and management information stored in the memory 202. The CPU 201 may be a physical CPU of a physical computer, or may be a virtual CPU in which a physical CPU of a physical computer is virtually allocated using a cloud virtualization function.

The memory 202 is a volatile semiconductor memory such as a static random access memory (RAM) (SRAM) or a dynamic RAM (DRAM), and stores various programs to be executed by the CPU 201 and management information to be referred to or updated by the CPU 201. The memory 202 may be a physical memory or may be a virtual memory in which a physical memory is virtually allocated using a cloud virtualization function.

The storage device 203 is a storage device that stores user data used by the primary host computer 104, the secondary host computer 107, and the like. Typically, the storage device 203 may be a non-volatile storage device. The storage device 203 may be, for example, a hard disk drive (HDD) or a solid state drive (SSD). The storage device 203 may be a physical storage device or a virtual storage device in which a physical storage device is virtually allocated using a cloud virtualization function.

The communication I/F 204 is an interface for performing communication via a network (communication between storage nodes via the inter-node network 103, communication with the primary host computer 104 and the primary management terminal 105 via the primary network 106, communication with the secondary host computer 107 and the secondary management terminal 108 via the secondary network 109, and communication between storage systems via the inter-storage system network 110), and is for example, a network interface card (NIC) or a fibre channel (FC) card. The communication I/F 204 may be a physical communication I/F or a communication I/F in which a physical communication I/F is virtually allocated using a cloud virtualization function.

Next, configurations of the primary host computer 104, the primary management terminal 105, the secondary host computer 107, and the secondary management terminal 108 will be described.

FIG. 3 is a configuration diagram of the host computer and the management terminal according to the first embodiment. Since the primary host computer 104, the primary management terminal 105, the secondary host computer 107, and the secondary management terminal 108 have a similar configuration, for convenience, the description will be given with reference to FIG. 3. Components similar to those shown in FIG. 2 are denoted by the same reference signs.

The primary host computer 104 (the primary management terminal 105, the secondary host computer 107, and the secondary management terminal 108) includes the CPU 201 as an example of the processor, the memory 202 as an example of the storage unit, and a communication I/F 204. These components 201, 202, and 204 are connected to each other via an internal bus or the like so as to be able to communicate with each other. There may be one or more of each of the CPU 201, the memory 202, and the communication I/F 204.

The CPU 201 controls the primary host computer 104 (the primary management terminal 105, the secondary host computer 107, and the secondary management terminal 108) based on a program and management information stored in the memory 202. The memory 202 stores a program to be executed by the CPU 201 and management information to be referred to or updated by the CPU 201. The communication I/F 204 is an interface for communicating with the storage system via a network (for communication with the storage system 100 via the primary network 106 or with the storage system 101 via the secondary network 109).

Next, a configuration of the memory 202 of the storage node 111 of the primary storage system 100 will be described.

FIG. 4 is a diagram showing the configuration of the memory of the storage node in the primary storage system according to the first embodiment.

The memory 202 of the storage node 111 stores a copy pair management program 401, a host I/O processing program 402, a write order management program 403, a journal data transfer program 404, a volume management program 405, a copy pair management table 406, a volume management table 407, and a write order management table 408.

The copy pair management program 401 is executed by the CPU 201 to execute a process such as creation, state change, and deletion of a copy pair (a pair of a primary volume and a secondary volume related to remote copy) in accordance with an instruction from the primary management terminal 105.

The host I/O processing program 402 is executed by the CPU 201 to execute an I/O process (read process, write process) according to an I/O request (read request, write request) issued from the primary host computer 104.

The write order management program 403 is executed by the CPU 201 to execute a process of storing differential data (journal data) obtained by adding time information to write data issued to a primary volume (PVOL) constituting a copy pair in a journal volume (JVOL).

Here, when there are a plurality of journal volumes as the copy destination that belong to the same CTG, an order in which records are added to a table and an order in which differential data is transferred may be changed depending on a difference in time taken for a process and communication, so that a write order of data may not be guaranteed when the data is reflected in the plurality of SVOLs via the plurality of journal volumes. Therefore, in order to align time cross sections of the data to guarantee the write order of data via the plurality of journal volumes, the write order management program 403 is executed by the CPU 201 to prevent a write process corresponding to a write request from the primary host computer 104, and execute a process to update time information to be added to the differential data during that time.

The journal data transfer program 404 is executed by the CPU 201 to transfer the differential data stored in the journal volume to the secondary storage system 101 via the inter-storage system network 110.

The volume management program 405 is executed by the CPU 201 to execute a volume management process such as volume creation and volume deletion in accordance with an instruction from the primary management terminal 105.

The copy pair management table 406 holds information related to a copy pair. The volume management table 407 holds information related to a volume. The write order management table 408 holds information related to write data corresponding to a write request issued to a primary volume implemented as a copy pair. Details of the copy pair management table 406, the volume management table 407, and the write order management table 408 will be described later.

Next, a configuration of the memory 202 of the storage node 102 in the secondary storage system 101 will be described.

FIG. 5 is a diagram showing the configuration of the memory of the storage node in the secondary storage system according to the first embodiment.

The memory 202 of the storage node 102 stores a journal data receiving program 501, a host I/O processing program 502, a data reflection arbitration program 503, a copy pair management program 504, a volume management program 505, a copy pair management table 506, a volume management table 507, and a write order management table 508. Here, the programs 401 to 405 of the memory 202 of the storage node 111 and the programs 501 to 505 of the memory 202 of the storage node 102 are examples of a remote copy control program.

The journal data receiving program 501 is executed by the CPU 201 to receive data transferred by the journal data transfer program 404 of the primary storage system 100, and store the data in a journal volume.

The host I/O processing program 502 is executed by the CPU 201 to execute an I/O process (read process, write process) according to an I/O request (read request, write request) from the secondary host computer 107.

The data reflection arbitration program 503 is executed by the CPU 201 to reflect data stored in a journal volume in a secondary volume (SVOL) based on time information while guaranteeing a write order in the CTG.

The copy pair management program 504 is executed by the CPU 201 to execute processes such as creation, state change, and deletion of a copy pair in accordance with an instruction from the secondary management terminal 108.

The volume management program 505 is executed by the CPU 201 to manage volumes such as volume creation and deletion in accordance with instructions from the secondary management terminal 108 and the storage system 100.

The copy pair management table 506 holds information related to a copy pair. The volume management table 507 holds information related to a volume. The write order management table 508 holds information related to write data corresponding to a write request issued to a primary volume implemented as a copy pair. Details of the copy pair management table 506, the volume management table 507, and the write order management table 508 will be described later.

In the storage system 101, the programs and data may be stored in all storage nodes 102, or a specific storage node 102 may be used as a representative node and the representative node may hold a table related to all storage nodes 102.

Next, the copy pair management tables 406 and 506 will be described in detail.

FIG. 6 is a configuration diagram of the copy pair management table according to the first embodiment. The copy pair management table 406 and the copy pair management table 506 have a similar configuration. FIG. 6 shows a specific example of the copy pair management table 406.

The copy pair management table 406 (similar for 506) stores a record for each copy pair. The record in the copy pair management table 406 (506) includes fields, which are a CTG ID 601, a primary system ID 602, a primary journal ID 603, a primary volume ID 604, a state 605, a secondary system ID 606, a secondary journal ID 607, a secondary volume ID 608, an operation mode 609, and a copy path ID 610.

The CTG ID 601 stores identification information (ID) of a CTG which is a range for guaranteeing a write order. Since the CTG which includes volumes constituting a copy pair of the remote copy is the same, and the same ID is assigned to the CTG in the primary storage system 100 and the secondary storage system 101. In the example in FIG. 6, the CTG ID 601 stores 1 which is an ID of the CTG 112 (CTG1) or 2 which is an ID of the CTG 113 (CTG2).

The primary system ID 602 stores an ID of a primary storage system in remote copy. In the example in FIG. 6, 1, which is the ID of the storage system 100, is stored in the primary system ID 602.

The primary journal ID 603 stores an ID of a journal (journal ID) to be stored before data, which is to be written when a write process on a primary volume (PVOL) is executed, is asynchronously transferred. One CTG requires one or more primary journal volumes and one or more secondary journal volumes. When a plurality of secondary volumes (SVOLs) in the secondary storage system span a plurality of storage nodes (when distributed to a plurality of storage nodes), a large number of journal volumes are required for the primary storage system and secondary storage system depending on the number of spanned storage nodes. In the example in FIG. 6, a record corresponding to the CTG1 stores 5 as a volume ID of the JVOL 116 (JVOL5), and records corresponding to the CTG2 include a record storing 6 as a volume ID of the JVOL 122 (JVOL6) and a record storing 7 as a volume ID of the JVOL 123 (JVOL7). In the example in FIG. 6, the volume ID of the journal volume is used as the journal ID, but the journal ID is not limited thereto, and an ID different from the volume ID may be used.

The primary volume ID 604 stores identification information (ID) of a primary volume in the remote copy. In a first record in FIG. 6, the primary volume ID 604 stores the PVOL1, which is an ID of the volume 114.

The state 605 stores a state of a copy pair. The state of the copy pair includes, for example, "pair forming" in which a process of forming a pair to transfer existing stored data of a primary volume to a secondary volume that is a copy pair of a secondary storage system immediately after creation of the copy pair is being executed, "pair" in which pair formation is completed and a transfer process of write data to be updated is started, "pair split" in which a transfer process of data to the secondary storage system is interrupted and only data capable of guaranteeing a write order in the CTG is reflected, and "failure" in which a write order of data is lost due to a failure. The state of the copy pair may be other states.

The secondary system ID 606 stores an ID of a secondary storage system in the remote copy. In the example in FIG. 6, 2, which is the ID of the storage system 101, is stored in the secondary system ID 606.

The secondary journal ID 607 stores an ID of a journal (journal ID) for storing differential data received from the primary storage system. In the example in FIG. 6, a record corresponding to the CTG1 stores 5 as a volume ID of the JVOL 117 (JVOL5), and records corresponding to the CTG2 include a record storing 6 as a volume ID of the JVOL 124 (JVOL6) and a record storing 7 as a volume ID of the JVOL 125 (JVOL7). In the example in FIG. 6, the volume ID of the journal volume is used as the journal ID, but the journal ID is not limited thereto, and an ID different from the volume ID may be used.

The operation mode 609 stores information on an operation mode for guaranteeing an update order of the asynchronous remote copy. The information on the operation mode includes "intra-node" indicating the same intra-node mode which is an operation mode in which the secondary journal volume of the CTG is in the same storage node, and "node spanning" indicating a node spanning mode which is an operation mode when the secondary journal volumes of the CTG span a plurality of storage nodes. In the present embodiment, the write order management program 403 switches a method for guaranteeing a data update order based on the information of the operation mode 609.

The copy path ID 610 stores an ID of a previously constructed path (copy path) in the inter-storage system network 110 used for data transfer between the copy pair between the storage system 100 and the storage system 101. A plurality of copy paths may be constructed between the primary and secondary storage systems.

Next, the volume management table 407 of the primary storage system 100 will be described in detail below.

FIG. 7 is a configuration diagram of the volume management table of the primary storage system according to the first embodiment.

The volume management table 407 manages records for each volume. The record of the volume management table 407 includes fields, which are a volume ID 701, a volume attribute 702, a maximum capacity 703, a data storage destination storage device 704, and a write I/O restriction flag 705.

The volume ID 701 stores an ID of a volume in the storage system 100.

The volume attribute 702 stores a volume attribute corresponding to the record. Volume attributes include "normal", which indicates that a volume is a normal volume connected to a host computer and capable of I/O, and "journal", which indicates that a volume is a journal volume (JVOL) that temporarily stores write data to a normal volume for asynchronous remote copy.

The maximum capacity 703 stores a maximum capacity of a volume corresponding to the record.

The data storage destination storage device 704 stores a name of a storage device to be a data storage destination assigned to the volume corresponding to the record. As a method for managing the name of the storage device, a Thin Provisioning function is typically applied, but another method may also be used.

A write I/O restriction flag 705 stores a state (ON or OFF) of a write I/O restriction flag indicating whether write to the volume corresponding to the record can be received. The state of the write I/O restriction flag is an example of restriction information. When the write I/O restriction flag is ON, write to the volume corresponding to the record is prevented. In the present embodiment, a write order of data is guaranteed by cooperation of prevention of writing to a volume according to the write I/O restriction flag and update control over time information.

For example, a record in a first row of the volume management table 407 is a record corresponding to a volume whose volume ID is 1, that is, the PVOL 114, and indicates that a type of the volume is normal, a maximum capacity is 100 GB, a data storage destination storage device is a storage device 1, and a write I/O restriction flag is OFF.

Next, the write order management table 408 of the primary storage system 100 will be described in detail.

FIG. 8 is a configuration diagram of the write order management table of the primary storage system according to the first embodiment.

The write order management table 408 is a table for managing a write process to the primary volume in a pair state in the storage system 100, a temporary storage destination of data, and a state until the data is reflected in the secondary volume in the storage system 101, and stores a record for each write process for the PVOL. The record of the write order management table 408 includes fields, which are an ID 801, a CTG ID 802, time information (generation number) 803, a write target volume ID 804, a write address 805, a journal volume ID 806, an address on a journal volume 807, and a reflection status 808.

The ID 801 stores a write order of data written to a volume of a copy pair in the storage system 100 in a pair state.

The CTG ID 802 stores an ID of a CTG targeted for a write process corresponding to the record.

The time information (generation number) 803 stores time information (for example, time zone) related to a time at which the write process corresponding to the record is executed. In the present embodiment, the time information is managed so as to be incremented at regular intervals, and it is possible to grasp in which time zone the write process corresponding to the record is executed based on the time information. In the present embodiment, the time information is a real number, but is not limited thereto, and may be time information provided by an NTP server or timer information in the storage system.

The write target volume ID 804 stores an ID of a volume which is in a pair state that is a target of a write request made by the primary host computer 104.

The write address 805 stores an address (logical block address: LBA) that is a target of the write process corresponding to the record.

The journal volume ID 806 stores a volume ID of a journal volume storing data to be written corresponding to the record.

The address on a journal volume 807 stores an address (LBA) of the journal volume in which the data to be written corresponding to the record is stored.

The reflection status 808 stores a reflection status of the data to be written in a secondary volume corresponding to the entry. In the reflection status, there are "not transferred" indicating a status in which target data is not transferred to the secondary storage system, and "transferred" indicating a status in which target data is transferred to the secondary storage system but is not reflected in the secondary volume. The reflection status may include other statuses.

For example, a record in a first row of the write order management table 408 is a record of the oldest write process in which a write order is 1, and indicates that the write process targets a CTG whose ID is 1, time information when the write process is executed is 1, an ID of a write target volume is 1 (that is, the write target volume is the PVOL 114 (PVOL1)), write target addresses are 0 to 255, a volume ID of a journal volume in which data to be written is stored is 5 (that is, JVOL 116 (JVOL5)), addresses of a journal volume to be written are 0 to 255, and data to be written is transferred to the secondary storage system.

Next, the volume management table 507 of the secondary storage system 101 will be described in detail.

FIG. 9 is a configuration diagram of the volume management table of the secondary storage system according to the first embodiment.

The volume management table 507 stores an entry for each volume in the secondary storage system. A record of the volume management table 507 includes fields, which are a volume ID 901, a volume attribute 902, a maximum capacity 903, a volume storage node 904, a data storage destination storage device 905, and a write I/O restriction flag 906.

The volume ID 901 stores an ID of a volume in the storage system 101.

The volume attribute 902 stores a volume attribute corresponding to the record. Volume attributes include "normal", which indicates that a volume is a normal volume connected to a host computer and capable of I/O, and "journal", which indicates that a volume is a journal volume (JVOL) that temporarily stores write data to a normal volume for asynchronous remote copy.

The maximum capacity 903 stores a maximum capacity of a volume corresponding to the record.

The volume storage node 904 stores an ID of a storage node in which a volume corresponding to the record is stored.

The data storage destination storage device 905 stores a name of a storage device to be a data storage destination assigned to the volume corresponding to the record. As a method for managing the name of the storage device, a Thin Provisioning function is typically applied, but another method may also be used.

A write I/O restriction flag 906 stores a state (ON or OFF) of a write I/O restriction flag indicating whether write to the volume corresponding to the record can be received. When the write I/O restriction flag is ON, write to the volume corresponding to the record is prevented. In the present embodiment, in the secondary storage system 101, the write process is prevented by setting the write I/O restriction flag to ON in the record, so that data at a certain time point on a primary side is guaranteed.

For example, a record in a first row of the volume management table 507 is a record corresponding to a volume whose volume ID is 1, that is, the SVOL 118, and indicates that a type of the volume is normal, a maximum capacity is 100 GB, a storage node that stores the volume is a storage node 1, a data storage destination storage device is a storage device 1, and a write I/O restriction flag is ON.

Next, the write order management table 508 of the secondary storage system 101 will be described in detail.

FIG. 10 is a configuration diagram of the write order management table of the secondary storage system according to the first embodiment.

The write order management table 508 is a table for managing a state from a journal volume in the secondary storage system 101 until data to be written is reflected in a secondary volume in a pair state, and stores a record for each write process to the SVOL to which the data is transmitted to the storage system 101. The record of the write order management table 508 includes fields, which are an ID 1001, a CTG ID 1002, time information (generation number) 1003, a write target volume ID 1004, a write address 1005, a journal volume ID 1006, an address on a journal volume 1007, and a reflection status 1008.

The ID 1001 stores a write order of data when the data is transferred to a secondary volume of a copy pair in the storage system 101 in the pair state.

The CTG ID 1002 stores an ID of a CTG targeted for a write process corresponding to the record.

The time information (generation number) 1003 stores time information (for example, time zone) related to a time at which the write process corresponding to the record is executed. In the present embodiment, the time information is managed so as to be incremented at regular intervals, and it is possible to grasp in which time zone the write process corresponding to the record is executed based on the time information. In the present embodiment, the time information is a real number, but is not limited thereto, and may be time information provided by an NTP server or timer information in the storage system.

The write target volume ID 1004 stores an ID of a volume to be written corresponding to the record.

The write address 1005 stores an address (logical block address: LBA) that is a target of the write process corresponding to the record.

The journal volume ID 1006 stores a volume ID of a journal volume storing data to be written corresponding to the record.

The address on a journal volume 1007 stores an address (LBA) of the journal volume in which the data to be written corresponding to the record is stored.

The reflection status 1008 stores a reflection status of the data to be written in a secondary volume corresponding to the entry. As the reflection status, there is "not reflected" indicating a status in which the target data is not reflected in the secondary volume, and "reflected" indicating a status in which the target data is reflected in the secondary volume. The reflection status may include other statuses.

For example, the write order management table 508 indicates a table in a status in which the data to be written corresponding to a record having an ID 801 of 8 in the write order management table 408 does not reach the storage system 101. For example, a record in a first row of the write order management table 508 is a record of the oldest write process in which a write order is 1, and indicates that the write process targets a CTG whose ID is 1, time information when the write process is executed is 1, an ID of a write target volume is 1 (that is, the write target volume is the SVOL 118 (SVOL1)), write target addresses are 0 to 255, a volume ID of a journal volume in which data to be written is stored is 5 (that is, JVOL 117 (JVOL5)), addresses of a journal volume to be written are 0 to 255, and the data to be written is not reflected in the SVOL.

Next, the pair creation process of creating a copy pair between the storage system 100 and the storage system 101 of the computer system 10 will be described.

Figure 11:
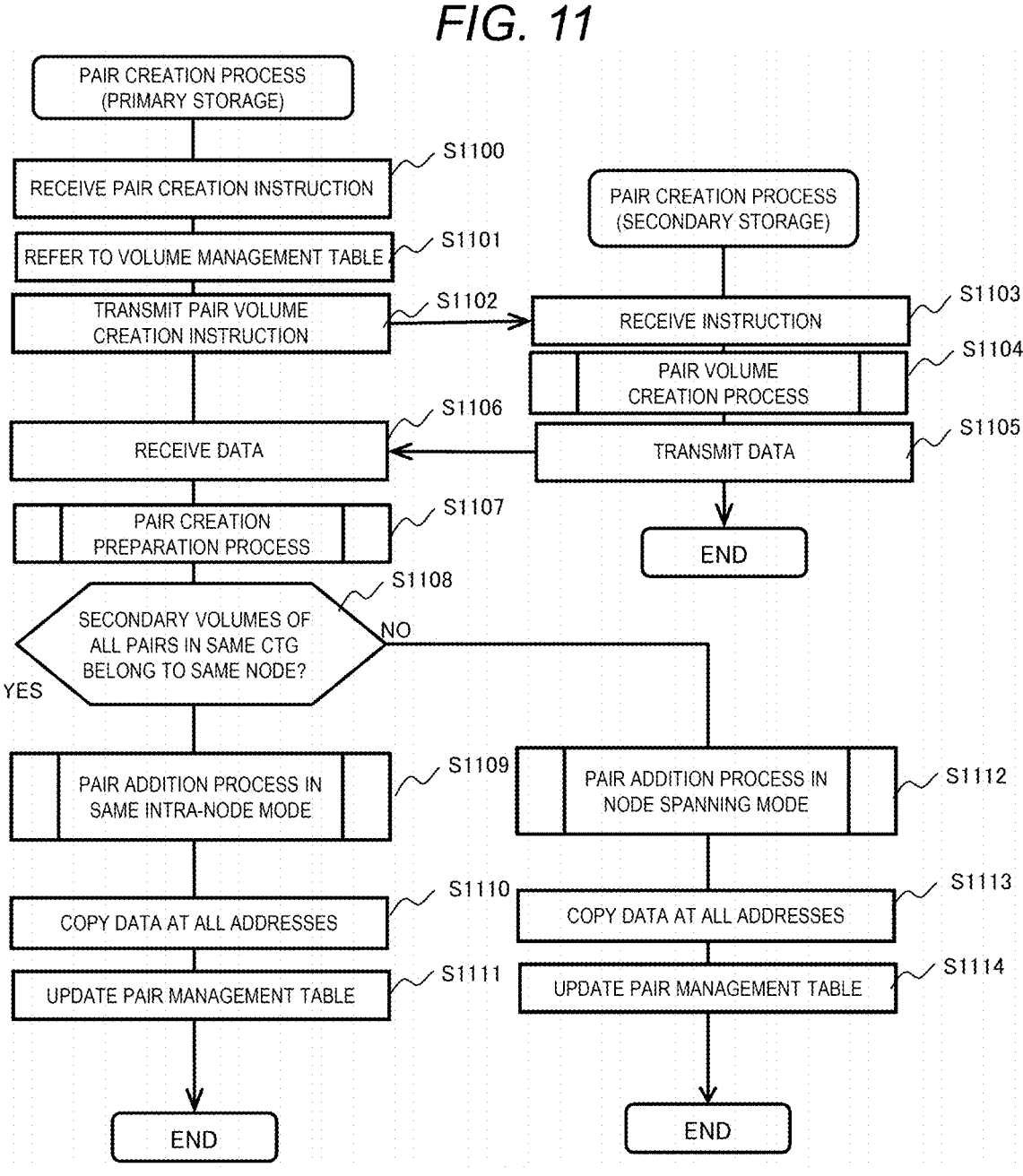
FIG. 11 is a flowchart of a pair creation process according to the first embodiment.

FIG. 11 is a flowchart of the pair creation process according to the first embodiment.

Here, it is assumed that, when executing the pair creation process, the primary management terminal 105 transmits a pair creation instruction (a CTG ID which is a range in which a write order is guaranteed, a primary volume (first volume) ID, and a system ID of the secondary storage system 101) to the storage node 111 of the storage system 100, for example, according to an instruction of a user.

The copy pair management program 401 (strictly speaking, the CPU 201 that executes the copy pair management program 401) of the primary storage node 111 receives the pair creation instruction from the primary management terminal 105 (S1100).

Next, the copy pair management program 401 refers to the volume management table 407 and checks a maximum capacity of the primary volume designated in the pair creation instruction (S1101) Next, the copy pair management program 401 transmits a pair volume creation instruction to the storage system 101 having the system ID designated in the pair creation instruction (S1102). Here, the pair volume creation instruction includes the designated CTG ID and a capacity of a secondary volume created as a pair.

The volume management program 505 of one of the storage nodes 102 in the storage system 101 receives the pair volume creation instruction (S1103), determines the storage node 102 in which a volume (SVOL) to be a copy pair is allocated based on the designated CTG ID by the pair volume creation instruction, and executes a pair volume creation process (see FIG. 12) of creating a journal volume as necessary (S1104).

The volume management program 505 transmits a response including the CTG ID, a volume ID of the SVOL to be the copy pair, and a volume ID of a journal volume associated with the SVOL to the storage node 111 (S1105).

The copy pair management program 401 receives the response from the storage system 101 (S1106), and executes a pair creation preparation process (see FIG. 13) of creating a new journal volume in the storage node 111 as necessary based on the CTG ID and the volume ID of the journal volume received as the response (S1107).

Next, the copy pair management program 401 determines whether the secondary volumes of all copy pairs that belong to the CTG with the designated CTG ID belong to the same storage node (S1108). Specifically, the copy pair management program 401 refers to the copy pair management table 406, and determines whether secondary journal IDs of all the copy pairs in the CTG with the same CTG ID and the volume IDs of the journal volumes in the response received in step S1106 are all the same ID.

As a result, if true (S1108: YES), the copy pair management program 401 advances the process to step S1109, and on the other hand, if false (S1108: NO), the copy pair management program 401 advances the process to step S1112.

In step S1109, the copy pair management program 401 adds copy pair information to the copy pair management table 406 in the same intra-node mode, and executes a pair addition process in the same intra-node mode (see FIG. 14) of instructing the storage system 101 to add pair information to the copy pair management table 506.

Next, the copy pair management program 401 copies all data in a primary volume of a newly created copy pair to a paired secondary volume in the storage system 101 (S1110). Here, in a process of copying all data, for example, the copy pair management program 401 typically assigns and manages a bitmap indicating whether there is uncopied data at each address in order to copy all data while executing a process corresponding to an I/O request from the primary host computer 104.

Next, the copy pair management program 401 updates the state 605 of a record corresponding to a copy pair created in the copy pair management table 406 to pair, and issues an instruction to update a state of the copy pair to the storage system 101 (S1111).

On the other hand, in step S1112, the copy pair management program 401 adds the pair information to the copy pair management table 406 as a node spanning mode, and executes the pair addition process in the node spanning mode (see FIG. 15) of instructing the storage system 101 to add pair information to the copy pair management table 506.

Next, the copy pair management program 401 copies all data in a primary volume of a newly created copy pair to a paired secondary volume in the storage system 101 (S1113). Here, in a process of copying all data, for example, the copy pair management program 401 typically assigns and manages a bitmap indicating whether there is uncopied data at each address in order to copy all data while executing a process corresponding to an I/O request from the primary host computer 104.

Next, the copy pair management program 401 updates the state 605 of a record in the copy pair management table 406 corresponding to the created copy pair to pair, and issues an instruction to update a state of the copy pair to the storage system 101 (S1114). Accordingly, the storage system 101 updates the state 605 of a record in the copy pair management table 506 corresponding to the created copy pair to pair.

Next, the pair volume creation process (S1104) in the storage system 101 will be described.

FIG. 12 is a flowchart of the pair volume creation process according to the first embodiment.

The volume management program 505 of the secondary storage system 101 refers to the copy pair management table 506 (S1200), and checks whether the designated CTG ID in the pair volume creation instruction is registered (S1201).

As a result, if the CTG ID is registered in the copy pair management table 506 (if true, S1201: YES), the volume management program 505 advances the process to step S1202, and if the CTG ID is not registered (if false, S1201: NO), the volume management program 505 advances the process to step S1207.

In step S1202, the volume management program 505 refers to the volume management table 507 and checks whether there is an available ID or which storage nodes have a large number of volumes allocated to the storage nodes.

Next, the volume management program 505 determines in which storage node a volume (pair volume) as a copy pair is to be created, based on the information checked in step S1202 (S1203). A method for determining the storage node as a volume creation destination may be determined based on the number of belonging volumes (the number of volumes) and a remaining capacity of the storage device. Typically, a storage node having a small number of belonging volumes or a storage node having a large remaining capacity of a storage device may be determined as the volume creation destination.

Next, the volume management program 505 creates a pair volume (second volume) for the determined storage node, and adds a record corresponding to the pair volume to the volume management table 507 (S1204).

Next, the volume management program 505 determines whether a journal volume that belongs to the designated CTG ID in the pair volume creation instruction exists in the storage node where the pair volume is created (S1205).

As a result, if a journal volume that belongs to the designated CTG ID in the pair volume creation instruction exists in the storage node where the pair volume is created (if true, S1205: YES), the volume management program 505 ends the process. On the other hand, if the journal volume that belongs to the designated CTG ID in the pair volume creation instruction does not exist in the storage node where the pair volume is created (if false: NO in S1205), the volume management program 505 creates a journal volume (second journal volume) in the storage node, adds a record corresponding to the journal volume to the volume management table 507 (S1206), and ends the process.

In step S1207, the volume management program 505 refers to the volume management table 507 and checks whether there is an available ID or which storage nodes have a large number of volumes allocated to the storage nodes.

Next, the volume management program 505 determines in which storage node a volume (pair volume) to be a copy pair is to be created, based on the information checked in step S1207 (S1208). A method for determining the storage node as a volume creation destination may be determined based on the number of belonging volumes and a remaining capacity of the storage device. Typically, a storage node having a small number of belonging volumes or a storage node having a large remaining capacity of a storage device may be determined as the volume creation destination.

Next, the volume management program 505 creates a pair volume for the determined storage node, and adds a record corresponding to the pair volume to the volume management table 507 (S1209).

Next, the volume management program 505 creates a journal volume in the determined storage node, adds a record corresponding to the journal volume to the volume management table 507 (S1210), and ends the process.

Next, the pair creation preparation process (S1107) in the storage system 100 will be described.

Figures 13, 14:
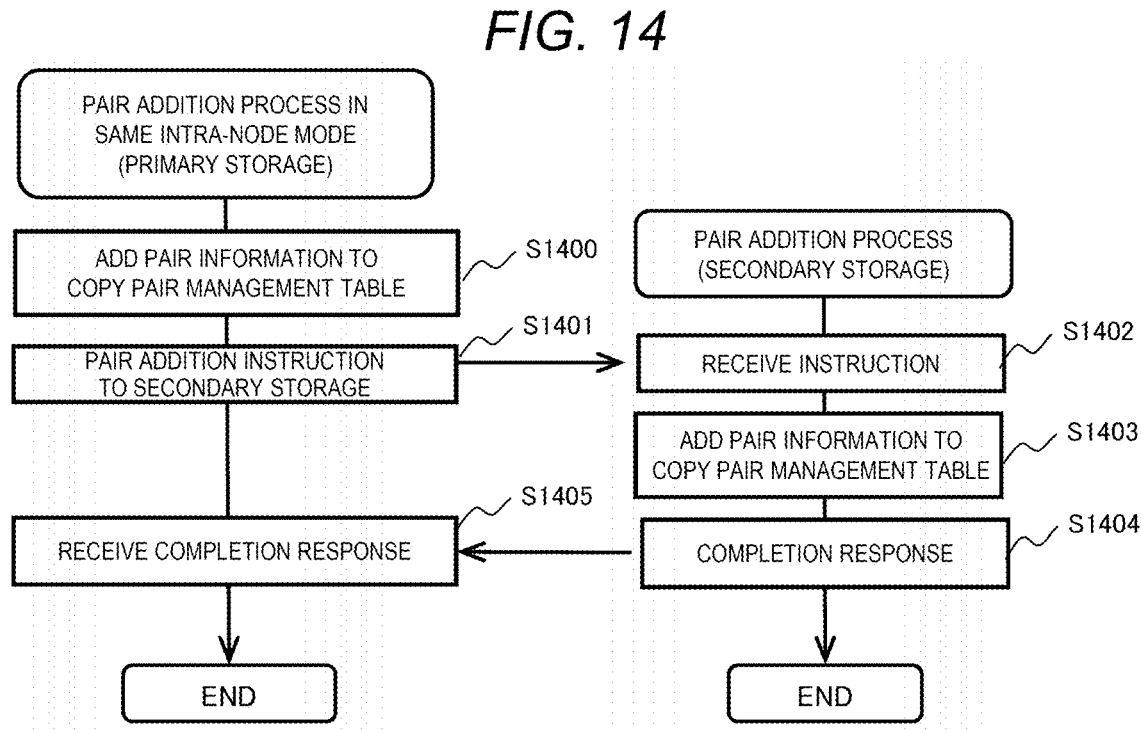
FIG. 13 is a flowchart of a pair creation preparation process according to the first embodiment.
FIG. 14 is a flowchart of a pair addition process in the same intra-node mode according to the first embodiment.

FIG. 13 is a flowchart of the pair creation preparation process according to the first embodiment.

The copy pair management program 401 of the storage system 100 refers to the copy pair management table 406 to check for an existing CTG ID (S1300). Next, the copy pair management program 401 refers to the volume management table 407 to check for an existing journal volume (S1301).

Next, the copy pair management program 401 determines whether the designated CTG ID in the pair creation instruction exists based on a check result of step S1300 (S1302).

As a result, if the designated CTG ID in the pair creation instruction exists (if true, S1302: YES), the copy pair management program 401 advances the process to step S1303, and on the other hand, if the designated CTG ID in the pair creation instruction does not exist (if false: S1302: NO), the copy pair management program 401 advances the process to step S1305.

In step S1303, the copy pair management program 401 determines whether an ID of the journal volume in the storage system 101 received in S1106 exists in the copy pair management table 406.

As a result, if the ID of the journal volume of the storage system 101 exists in the copy pair management table 406 (if true, S1303: YES), the copy pair management program 401 ends the process.

On the other hand, if the ID of the journal volume in the storage system 101 does not exist in the copy pair management table 406 (if false, S1303: NO), the copy pair management program 401 creates a corresponding journal volume (first journal volume) in the storage system 100, adds a record of the created journal volume to the volume management table 407 (S1304), and ends the process.

In step S1305, the copy pair management program 401 creates a corresponding journal volume in the storage system 100, and adds a record of the created journal volume to the volume management table 407. Thereafter, the copy pair management program 401 ends the process.

Next, the pair addition process in the same intra-node mode (S1109) in the computer system 10 will be described.

FIG. 14 is a flowchart of the pair addition process in the same intra-node mode according to the first embodiment.

The copy pair management program 401 adds a record corresponding to the copy pair to be created to the copy pair management table 406, with the operation mode 609 set to intra-node (S1400). Next, the copy pair management program 401 transmits a pair addition instruction to the secondary storage system 101 (S1401).

On the other hand, the copy pair management program 504 of the storage system 101 receives the pair addition instruction (S1402), adds a record of the copy pair to be created to the copy pair management table 506 with the operation mode 609 set to intra-node (S1403), and transmits a pair addition completion response to the storage system 100 (S1404).

Next, the copy pair management program 401 of the storage system 100 receives the completion response (S1405), and ends the pair addition process in the same intra-node mode.

Next, the pair addition process in the node spanning mode (S1112) in the computer system 10 will be described.

Figure 15:
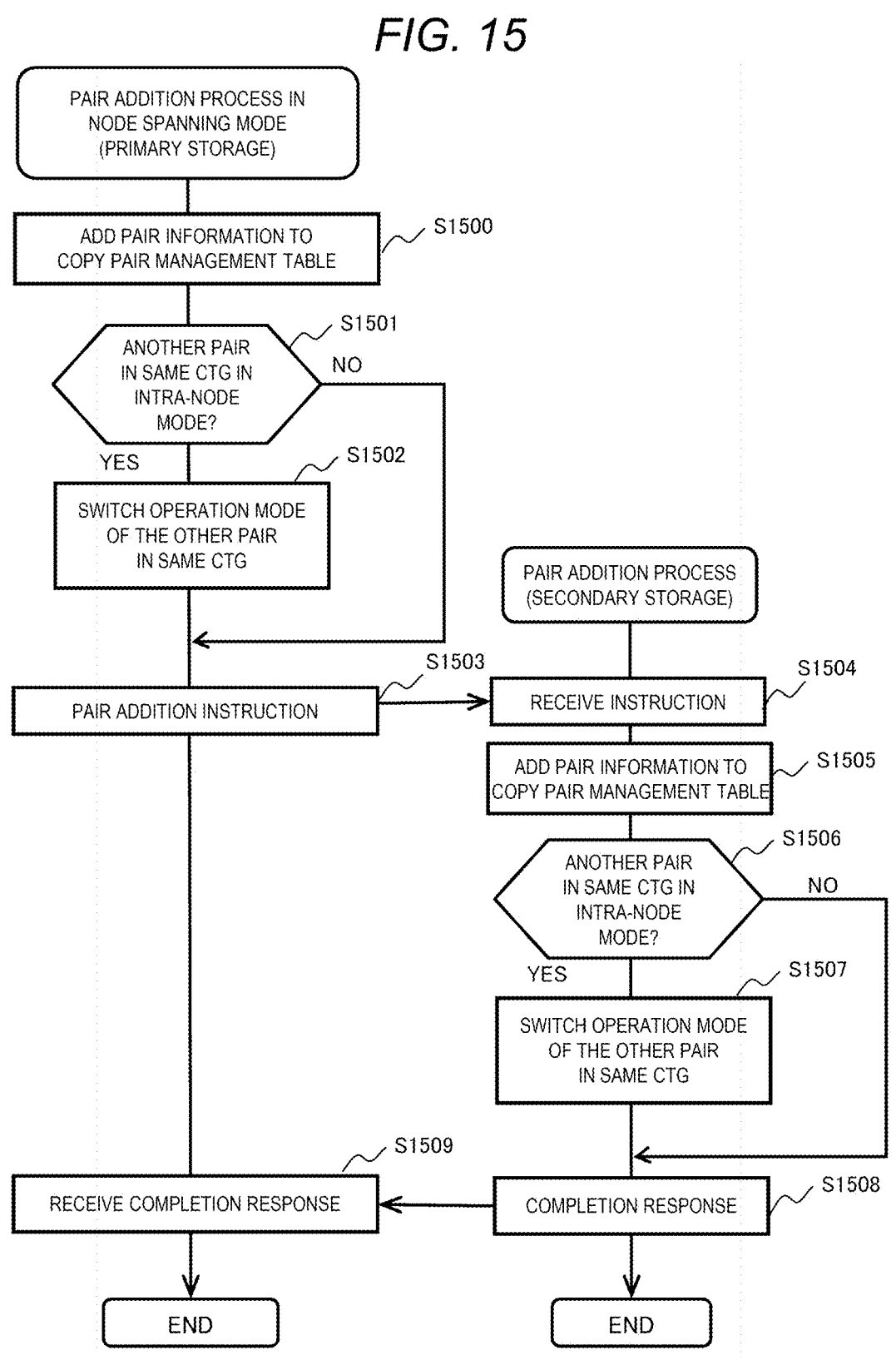
FIG. 15 is a flowchart of a pair addition process in a node spanning mode according to the first embodiment.

FIG. 15 is a flowchart of the pair addition process in the node spanning mode according to the first embodiment.

The copy pair management program 401 of the storage system 101 adds a record of the copy pair to be created to the copy pair management table 406, with the operation mode 609 set to node spanning (S1500).

Next, the copy pair management program 401 checks the copy pair management table 406, and determines whether the operation mode 609 of records of all copy pairs having the same CTG ID is intra-node (S1501). As a result, if the operation mode 609 of the record of another copy pair having the same CTG ID is intra-node (if true, S1501: YES), the copy pair management program 401 advances the process to step S1502, and on the other hand, if the operation mode 609 of the record of the other copy pair is node spanning (if false, S1501: NO), the copy pair management program 401 advances the process to step S1503.

In step S1502, the copy pair management program 401 checks the copy pair management table 406, switches the operation mode 609 of the records of all copy pairs having the same CTG ID to node spanning, and advances the process to step S1503.

In step S1503, the copy pair management program 401 transmits a pair addition instruction to the storage system 101.

The copy pair management program 504 of the storage system 101 receives the pair addition instruction (S1504), and adds a record of a copy pair to be added to the copy pair management table 506 with the operation mode 609 as node spanning (S1505).

Next, the copy pair management program 504 checks the copy pair management table 506, and determines whether the operation mode 609 of a record of another copy pair having the same CTG ID is intra-node (S1506). As a result, if the operation mode 609 of the record of the other copy pair having the same CTG ID is intra-node (if true, S1506: YES), the copy pair management program 504 advances the process to step S1507, and on the other hand, if the operation mode 609 of the record of the other copy pair is node spanning (if false, S1506: NO), the copy pair management program 504 advances the process to step S1508.

In step S1507, the copy pair management program 504 checks the copy pair management table 506, switches the operation mode 609 of the records of all copy pairs having the same CTG ID to node spanning, and advances the process to step S1508.

In step S1508, the copy pair management program 504 transmits a pair addition completion response to the storage system 100.

Next, the copy pair management program 401 of the storage system 100 receives the completion response (S1509), and ends the pair addition process in the node spanning mode.

Next, a host I/O process in the computer system 10 will be described.

Figure 16:
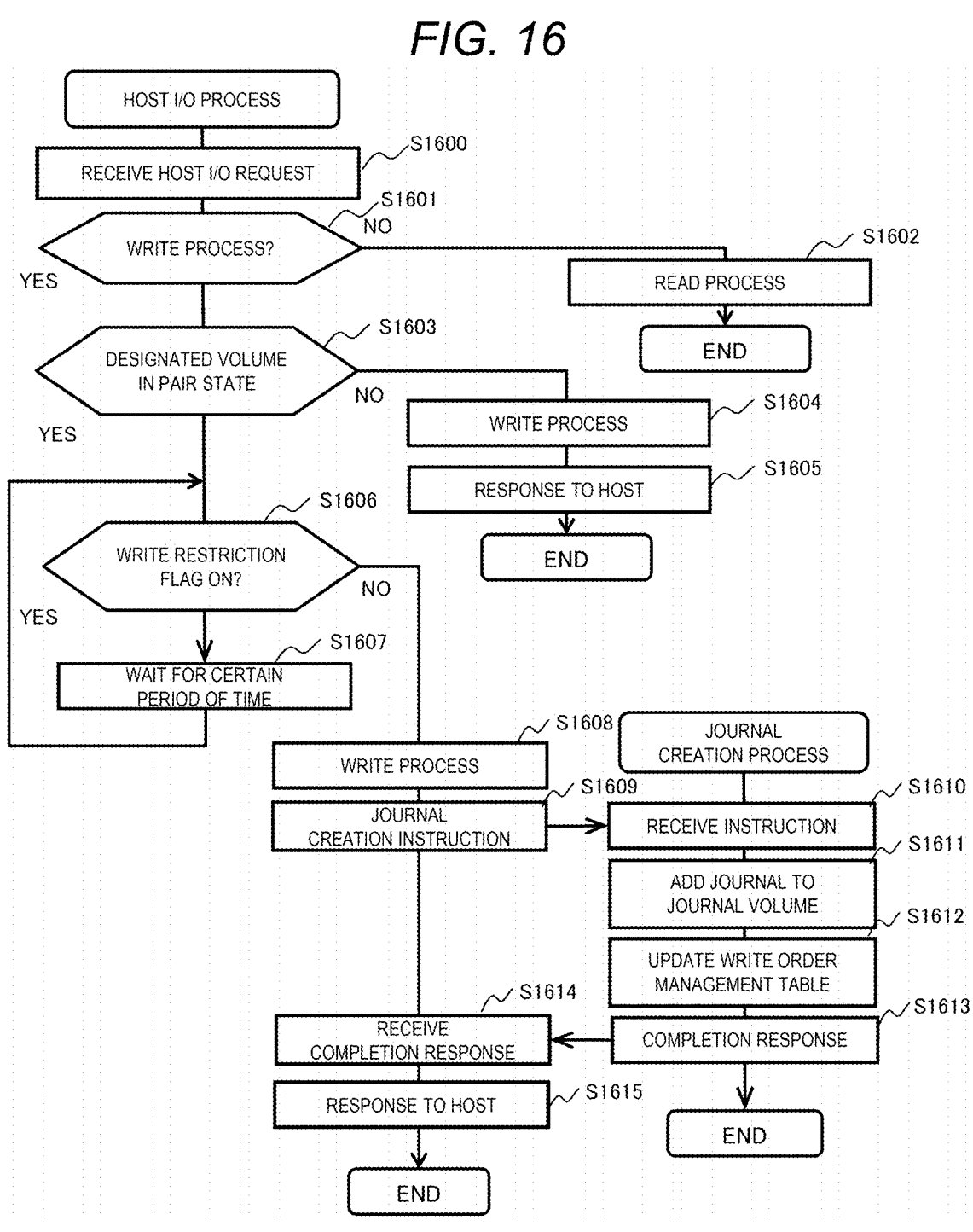
FIG. 16 is a flowchart of a host I/O process according to the first embodiment.

FIG. 16 is a flowchart of the host I/O process according to the first embodiment.

The host I/O processing program 402 of the storage system 100 receives an I/O request issued by the primary host computer 104 (S1600). Here, the I/O request includes logical unit number (LUN), a type of I/O (write process or read process), a start address, an amount of data, and the like, and further includes real data to be written if the I/O request is the write process. A correspondence between the LUN and a volume ID is managed in the storage system 100 according to the existing technology.

Next, the host I/O processing program 402 determines whether the I/O request is a write process (S1601). As a result, if the I/O request is a write process (if true, S1601: YES), the host I/O processing program 402 advances the process to step S1603, and on the other hand, if the I/O process is a read process (if false, S1601: NO), the host I/O processing program 402 advances the process to step S1602.

In step S1602, the host I/O processing program 402 executes the read process. Typically, if past data at an address targeted by the I/O request exists in a cache, the host I/O processing program 402 reads the cache data, if the past data does not exist, reads the data from a storage device where the data is stored, and transmits the read data to the primary host computer 104.

In step S1603, the host I/O processing program 402 refers to the copy pair management table 406, and determines whether a volume ID corresponding to the LUN of the I/O request is recorded as a primary volume ID and a state is pair. As a result, if the volume ID corresponding to the LUN is recorded as the primary volume ID and the state is pair (if true, S1603: YES), the host I/O processing program 402 advances the process to step S1606, and if the volume ID corresponding to the LUN is recorded as the primary volume ID and the state is not pair (if false, S1603: NO), the host I/O processing program 402 advances the process to step S1604.

In step S1604, the host I/O processing program 402 executes a write process. Typically, if past data at an address targeted by an I/O request exists in a cache, the host I/O processing program 402 updates the cache data, and if the past data does not exist, writes new data to the cache. Next, the host I/O processing program 402 transmits a write process completion response to the primary host computer 104 (S1605).

In step S1606, the host I/O processing program 402 refers to the volume management table 407, and determines whether the write I/O restriction flag 705 of the target volume in the write process is ON. As a result, if the write I/O restriction flag 705 of the target volume is ON (if true, S1606: YES), the host I/O processing program 402 advances the process to step S1607, and on the other hand, if the write I/O restriction flag 705 of the target volume is not ON (if false, S1606: NO), the host I/O processing program 402 advances the process to step S1608.

In step S1607, the host I/O processing program 402 waits for a certain period of time in order to wait for a process of updating time information on a journal in order to align time cross sections of data, and then advances the process to step S1606.

In step S1608, the host I/O processing program 402 executes a write process.

Next, the host I/O processing program 402 issues a journal creation instruction to the write order management program 403 for data subjected to the write process in step S1608, designating a parameter designated at the time of the write process (S1609). Here, the parameter includes a volume ID and a start address.

The write order management program 403 receives the journal creation instruction (S1610). Next, the write order management program 403 refers to the copy pair management table 406, checks an ID of a primary journal volume corresponding to a write target volume, and stores written data in an empty area of a journal volume having the checked ID (S1611).

Next, the write order management program 403 adds a record including an address of the data written in step S1611 to the write order management table 408 (S1612). Next, the write order management program 403 transmits completion of addition to the journal to the host I/O processing program 402 (S1613).

The host I/O processing program 402 receives a completion response (S1614). Next, the host I/O processing program 402 transmits a write process completion response to the primary host computer 104 (S1615).

According to the host I/O process described above, it is possible to appropriately prevent execution of the write process for a volume in which the write I/O restriction flag 705 is ON, in order to wait for a process of updating the time information on the journal.

Next, a write order management process in the computer system 10 will be described.

FIG. 17 is a flowchart of the write order management process according to the first embodiment.

The write order management process is started when a copy pair is created in the computer system 10, for example.

Here, the host I/O process and the write order management process are examples of a write order guarantee process.

The write order management program 403 refers to the copy pair management table 406, and acquires information on all existing copy pairs (S1700).

Next, the write order management program 403 determines whether a primary volume exists in which the state 605 is pair and the operation mode 609 is node spanning, based on the acquired information on the copy pair (S1701). As a result, if such a primary volume exists (if true, S1701: YES), the write order management program 403 advances the process to S1702, and on the other hand, if such a primary volume does not exist (if false, S1701: NO), the write order management program 403 advances the process to step S1705.

In step S1702, the write order management program 403 sets the write I/O restriction flag 705 in the volume management table 407 to ON for all primary volumes in which the state 605 is pair and the operation mode 609 is node spanning. Accordingly, a write process to a volume by the host computer is prevented.

Next, the write order management program 403 increases a set value of the time information applied at the time of adding the journal by 1 (updates one generation) (S1703). Accordingly, in the following, this set value is applied to the write process.

Next, the write order management program 403 sets the write I/O restriction flag 705 in the volume management table 407 to OFF for all primary volumes in which the state 605 is pair and the operation mode 609 is node spanning (S1704), and advances the process to step S1705. Accordingly, the write process to a volume by the host computer is resumed.

In step S1705, the write order management program 403 waits for a certain period of time until a next time the time information is updated, and advances the process to step S1700 after waiting. In the above-described write order management process, steps S1702 to S1704 are executed for all primary volumes in which the state 605 is pair and the operation mode 609 is node spanning, and the invention is not limited thereto, for example, the processes of steps S1702 to S1704 may be executed with different timings for each CTG. In this way, it is possible to reduce an influence of the prevention of the write process in the computer system 10.

Next, a journal data transfer process in the computer system 10 will be described.

Figure 18:
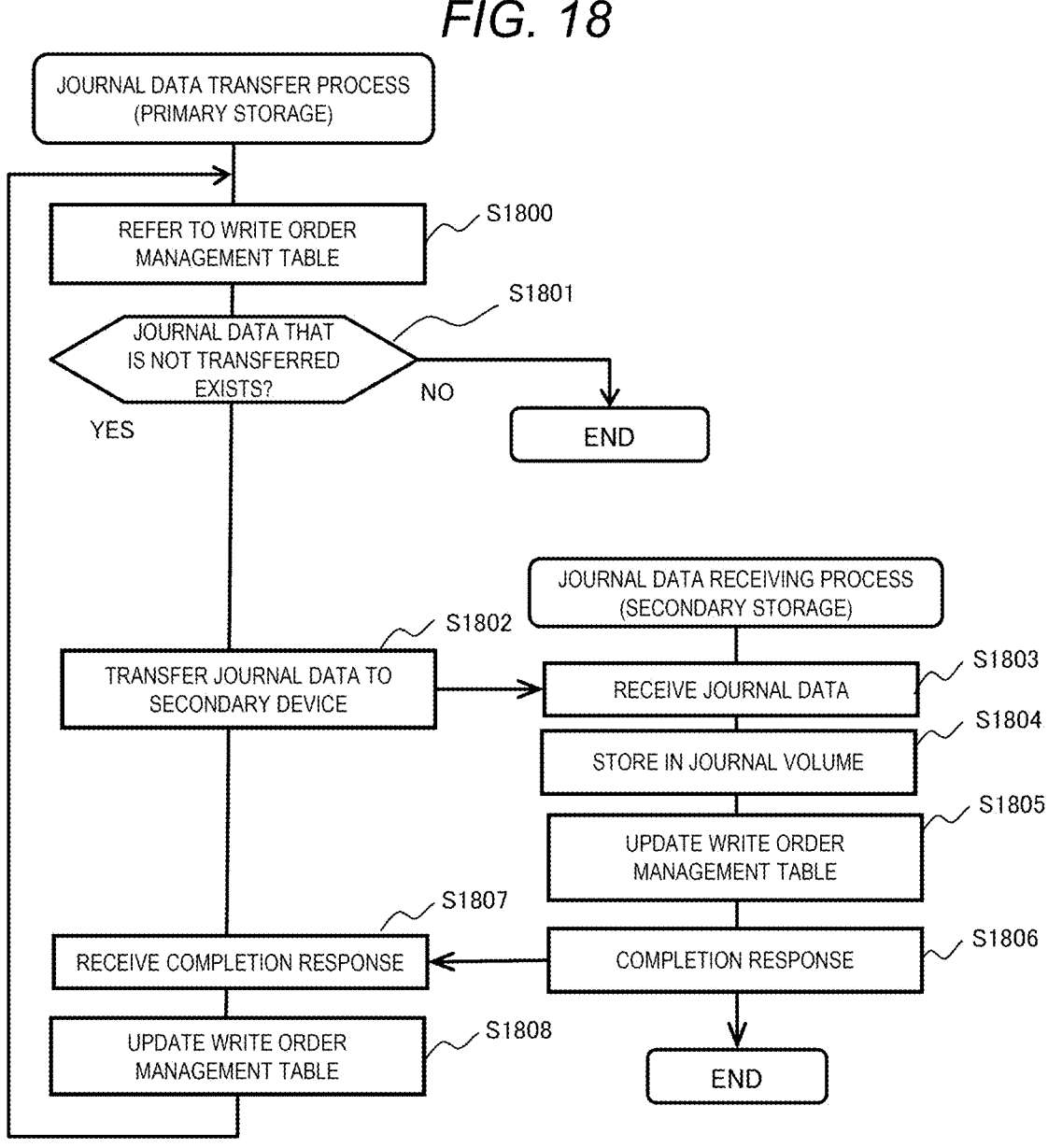
FIG. 18 is a flowchart of a journal data transfer process according to the first embodiment.

FIG. 18 is a flowchart of the journal data transfer process according to the first embodiment.

The journal data transfer program 404 of the storage system 100 refers to the write order management table 408, and acquires information on all write processes (S1800). Next, the journal data transfer program 404 determines whether journal data that is not transferred exists based on the reflection status 808 (S1801).

As a result, if journal data that is not transferred exists (if true, S1801: YES), the journal data transfer program 404 advances the process to step S1802, and on the other hand, if the journal data that is not transferred does not exist (if false, S1801: NO), the journal data transfer program 404 ends the process.

In step S1802, the journal data transfer program 404 transfers the journal data that is not transferred to the storage system 101 which is the secondary storage system. Specifically, the journal data transfer program 404 refers to an ID of a journal volume in the ID 806 of a record in the write order management table 408 corresponding to the journal data that is not transferred and an address in the address on a journal volume 807, reads data from a corresponding address of the journal volume corresponding to the ID, refers to the copy pair management table 406, selects a copy path in the copy path ID 610 of the corresponding record, designates a volume ID in the secondary volume ID 608 of the record as a parameter, and transfers the journal data.

The journal data receiving program 501 of the storage system 101 receives the transferred journal data (S1803), refers to the copy pair management table 506, specifies a secondary journal ID corresponding to the designated secondary volume ID, and stores the journal data in the specified journal volume (S1804).

Next, the journal data receiving program 501 registers information on the received journal data and information such as an address of a journal volume to which the journal data is written, as a record in the write order management table 508 (S1805). Next, the journal data receiving program 501 transmits a completion response to the storage system 100 (S1806).

The journal data transfer program 404 of the storage system 100 receives the completion response (S1807). Next, the journal data transfer program 404 updates the reflection status 808 of the record in the write order management table 408 that corresponds to the journal data for which the transfer is completed to transferred (S1808), and advances the process to step S1800.

In the journal data transfer process in FIG. 18, an example is shown in which journal data is transferred from the primary storage system to the secondary storage system with the primary side as a starting point, but the invention is not limited thereto. The secondary storage system may periodically request the primary storage system to transfer journal data, and the primary storage system may transmit the journal data in response thereto.

Next, a data reflection arbitration process in the storage system 101 will be described.

Figure 19:
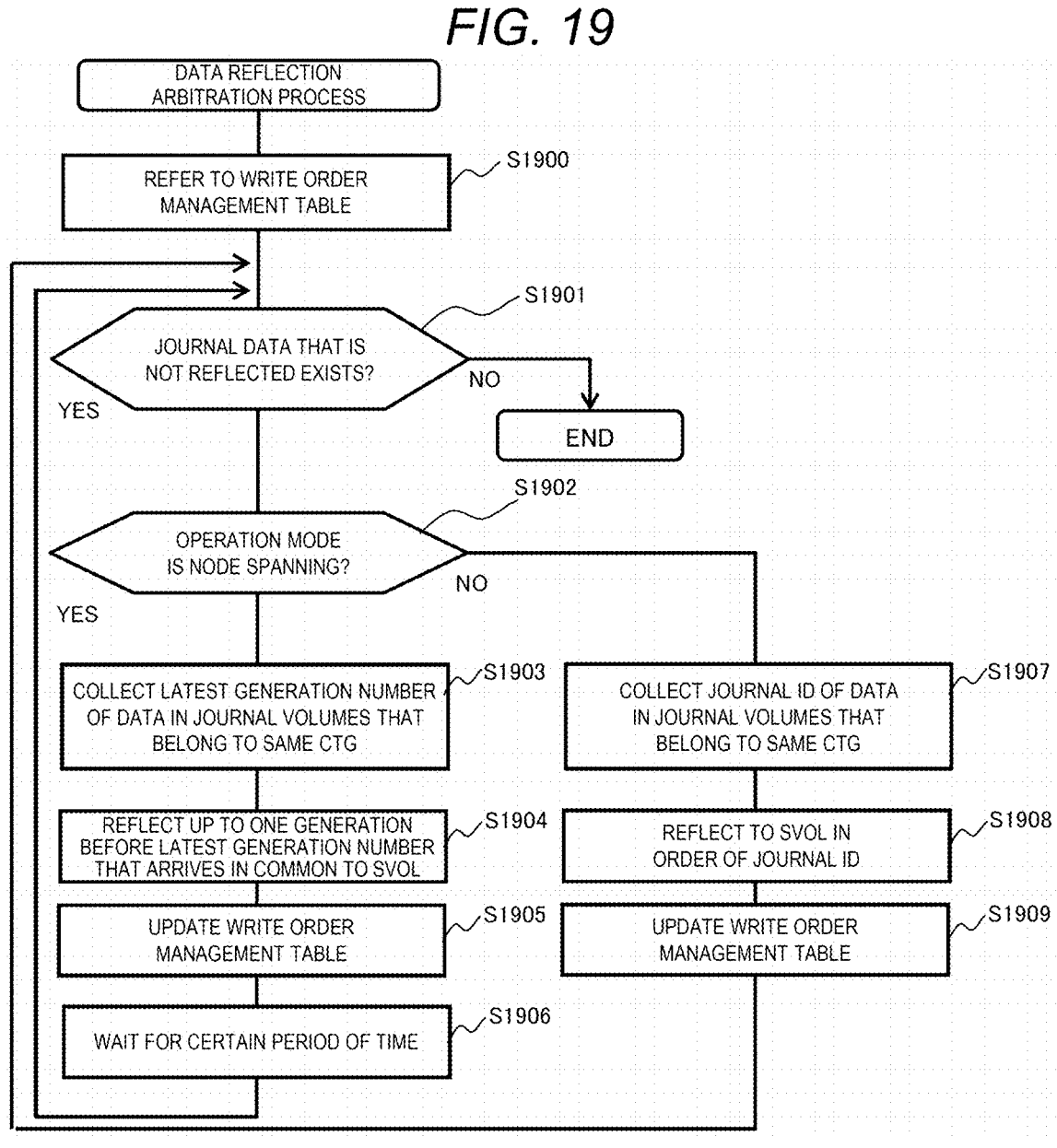
FIG. 19 is a flowchart of a data reflection arbitration process according to the first embodiment.

FIG. 19 is a flowchart of the data reflection arbitration process according to the first embodiment.

The data reflection arbitration process is executed periodically, for example. The data reflection arbitration program 503 of the storage system 101 refers to the write order management table 508, and acquires information on records corresponding to all journal data (S1900). Next, the data reflection arbitration program 503 determines whether there is a record in which the reflection status 1008 is not reflected in the records (S1901), thereby determining whether journal data that is not reflected to the volume exists. As a result, if the journal data that is not reflected exists (if true, S1901: YES), the data reflection arbitration program 503 advances the process to step S1902, and if the journal data that is not reflected does not exist (if false, S1901: NO), the data reflection arbitration program 503 ends the process.

In step S1902, the data reflection arbitration program 503 refers to the copy pair management table 506 based on the write target volume ID corresponding to the journal data, and determines whether the operation mode 609 of a record of a copy pair corresponding to the volume ID is node spanning.

As a result, if the operation mode 609 is node spanning (if true, S1902: YES), the data reflection arbitration program 503 advances the process to step S1903, and on the other hand, if the operation mode 609 is intra-node (if false, S1902: NO), the data reflection arbitration program 503 advances the process to step S1907.

In step S1903, the data reflection arbitration program 503 refers to the write order management table 508, and collects the latest time information 1003 of the journal data corresponding to secondary journal IDs that belong to the same CTG ID (S1903).

Here, all journal data up to a generation before the latest generation that arrives for each secondary journal that belongs to the same CTG (that is, a generation whose time information has a generation number obtained by subtracting 1 from the latest generation number) is already arrived at the secondary journal volume. Therefore, the data reflection arbitration program 503 reflects the journal data that is not reflected up to the time information of the previous generation to the address in the write address 1005 of the volume (SVOL) corresponding to a volume ID in the volume ID 1004 of the write target, which is the secondary volume (S1904).

The data reflection arbitration program 503 updates the reflection status 1008 of a record corresponding to the journal data for which the reflection to the secondary volume is completed to reflected (S1905). At this time, the data reflection arbitration program 503 may notify the storage system 100 that the journal data is reflected, and delete the record corresponding to the journal data from the write order management tables 408 and 508.

After completion of the reflection of the journal data, the data reflection arbitration program 503 waits for a certain period of time (S1906), and thereafter advances the process to step S1901.

In step S1907, the data reflection arbitration program 503 collects journal data for secondary journal IDs that belong to the same CTG ID.

Here, since an order of journal IDs in the data in the journal volume matches a write order, arbitration between a plurality of journals is unnecessary. Therefore, the data reflection arbitration program 503 reflects the journal data that is not reflected to an address corresponding to the write address 1005 of a volume corresponding to a volume ID in the write target volume ID 1004, which is the secondary volume, in order from the smallest number of ID (S1908).

Next, the data reflection arbitration program 503 updates the reflection status 1008 of a record corresponding to the journal data for which the reflection to the secondary volume is completed to reflected (S1909), and advances the process to step S1901. At this time, the data reflection arbitration program 503 may notify the storage system 100 that the journal data is reflected, and delete the record corresponding to the journal data from the write order management tables 408 and 508.

In the present embodiment, the data reflection arbitration process is executed in the secondary storage system, but the primary storage system 100 may refer to time information on a record in which the reflection status 808 in the record of the write order management table 408 is transferred, periodically notify the secondary storage system that up to one generation before the latest generation number that arrives can be reflected, and the secondary storage system that receives the notification reflects the journal data in the secondary volume.

In the present embodiment, journal data is created at the time of the I/O process and is continuously transferred to the secondary storage system, but, for example, snapshots may be created periodically, at a granularity such as several minutes, several hours, or several days, in which write I/O is prevented, and data may be reflected (copied) to the secondary side by transferring a difference from a previous snapshot to the secondary storage system.

Second Embodiment

Next, a computer system according to a second embodiment will be described. Here, in the present embodiment, basically, a portion different from the computer system according to the first embodiment will be described. Functional components similar to those of the computer system according to the first embodiment will be described using the same reference signs.

In the second embodiment, the storage nodes 102 in the storage system 101 have different information on division of functions, ways of holding a table, and pair creation instructions from a user.

First, the division of functions of the storage nodes 102 and the way of holding the table will be described. Each storage node 102 operates independently, similar to the storage system 100, but has the same ID as the storage system.

The storage node 102 of the storage system 101 includes a representative node and other nodes (general nodes). In the representative node, all programs similar to those in the first embodiment operate, and each table has records for all storage nodes in the storage system 101. On the other hand, the general node only has a record related to a volume or a copy pair that belongs to itself, and operates upon receiving an instruction from the representative node, so that only some of programs operate.

Next, information designated by the user as a pair creation instruction will be described. When creating a pair, it is assumed that paths between primary and secondary storage systems are constructed in advance, and a journal volume and primary and secondary volumes are already created by the user.

In this configuration, the user designates a CTG ID, a journal volume ID, a primary volume ID, and a secondary volume ID as a pair creation instruction. In a communication device system according to the present embodiment, the primary storage system cannot recognize that the secondary storage system is a storage system including a plurality of nodes, and cannot directly execute operations on appropriate storage nodes. Therefore, in the present embodiment, an operation instruction is transferred between storage nodes in the secondary storage system so as to enable an operation to a storage node having a volume to be operated.

Figure 20:
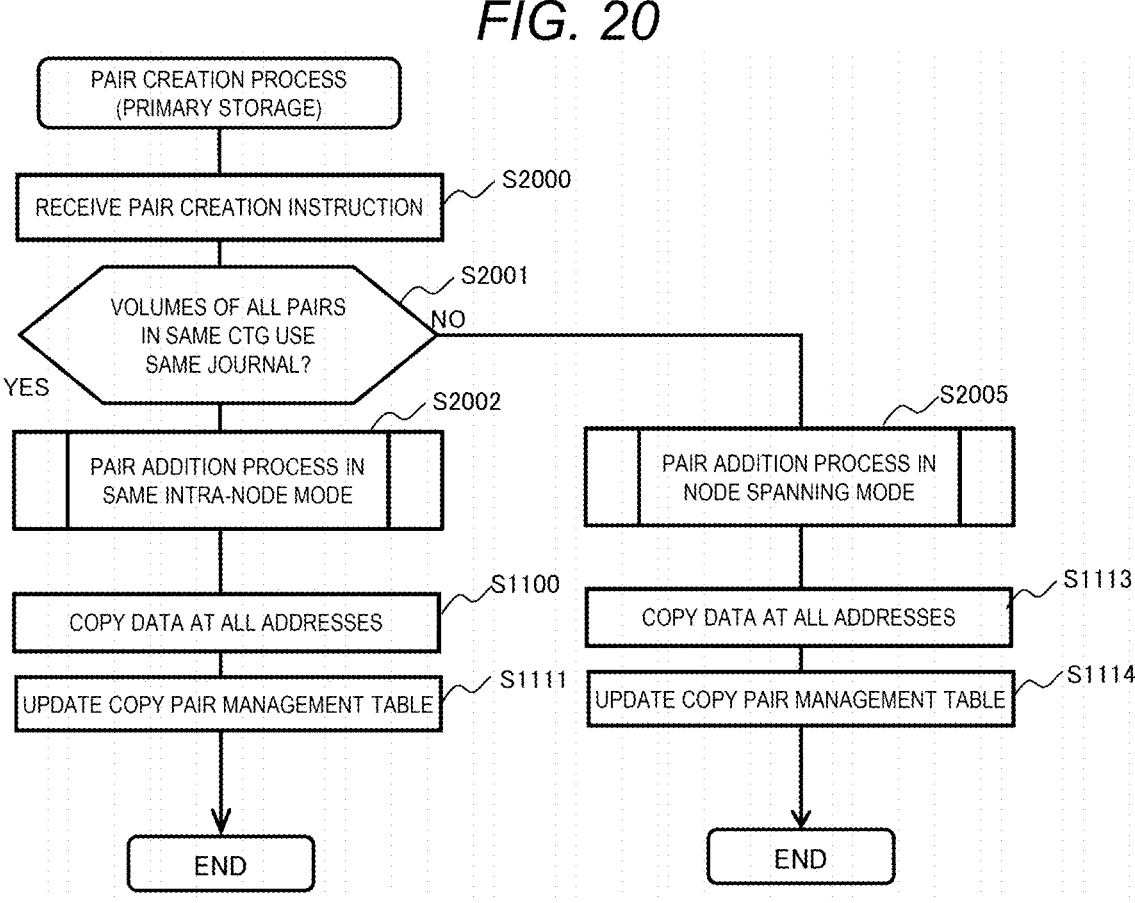
FIG. 20 is a flowchart of a pair creation process according to a second embodiment.

FIG. 20 is a flowchart of a pair creation process according to the second embodiment. Similar process steps as the pair creation process according to the first embodiment shown in FIG. 11 are denoted by the same reference signs.

Here, the primary management terminal 105 executes the pair creation process. For example, it is assumed that a pair creation instruction (a CTG ID, which is a range in which a write order is guaranteed, a primary journal volume ID, a secondary journal volume ID, a primary volume ID, and a secondary volume ID) is transmitted to the storage node 111 of the storage system 100 based on an instruction of a user.

The copy pair management program 401 (strictly speaking, the CPU 201 that executes the copy pair management program 401) of the primary storage node 111 receives the pair creation instruction from the primary management terminal 105 (S2000).

Next, the copy pair management program 401 refers to the copy pair management table 406, and determines whether the primary journal ID that belongs to the CTG ID designated by the pair creation instruction is single and is the same ID as the primary journal ID designated by the pair creation instruction (S2001). As a result, if the primary journal ID that belongs to the designated CTG ID is single and is the same ID as the primary journal ID designated by the pair creation instruction (if true, S2001: YES), the copy pair management program 401 advances the process to step S2002, and on the other hand, if the primary journal ID that belongs to the designated CTG ID is single and is not the same ID as the primary journal ID designated by the pair creation instruction (if false, S2001: NO), the copy pair management program 401 advances the process to step S2005.

In step S2002, the copy pair management program 401 executes a pair addition process in the same intra-node mode (see FIG. 21), and copies data at all addresses (S1100) and updates the copy pair management table 406 (S1111).

In step S2005, the copy pair management program 401 executes a pair addition process in a node spanning mode (see FIG. 22), and copies data at all addresses (S1113) and updates the copy pair management table 406 (S1114).

Next, the pair addition process in the same intra-node mode (S2002) in the computer system 10 will be described.

Figure 21:
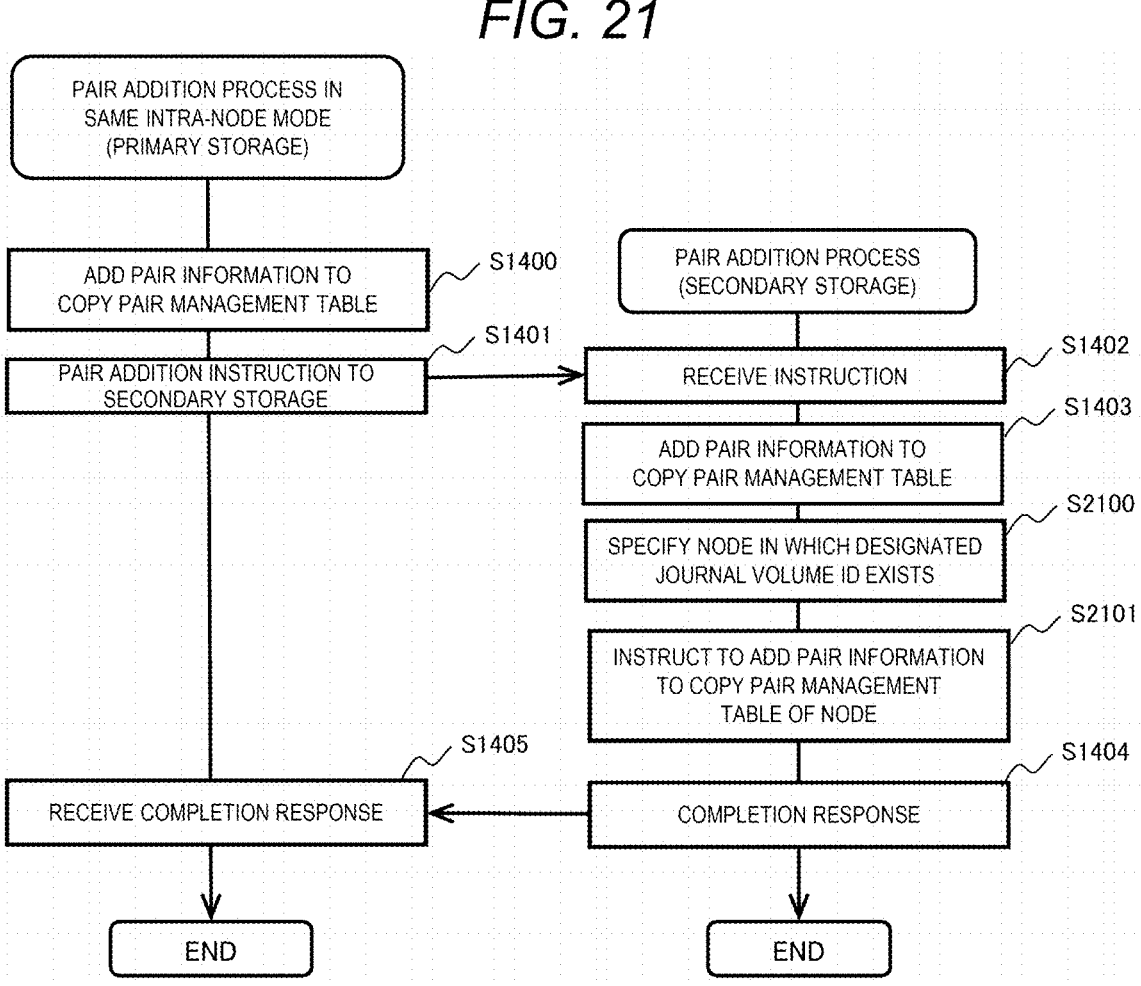
FIG. 21 is a flowchart of a pair addition process in the same intra-node mode according to the second embodiment.

FIG. 21 is a flowchart of the pair addition process in the same intra-node mode according to the second embodiment. In FIG. 21, steps similar to the pair addition process in the same intra-node mode according to the first embodiment shown in FIG. 14 are denoted by the same reference signs. In the second embodiment, the processes of steps S1402, S1403, and S1404 are executed by a representative storage node (representative node) among the plurality of storage nodes 102.

The copy pair management program 504 of the representative node refers to the volume management table 507, and checks to which storage node 102 the journal volume of the copy pair added in step S1403 belongs (S2100).

Next, the copy pair management program 504 of the representative node instructs the specified storage node 102 to add a record related to the copy pair to the copy pair management table 506, which has only records of volumes related to the storage node (S2101).

Next, the pair addition process in the node spanning mode (S2005) in the computer system 10 will be described.

Figure 22:
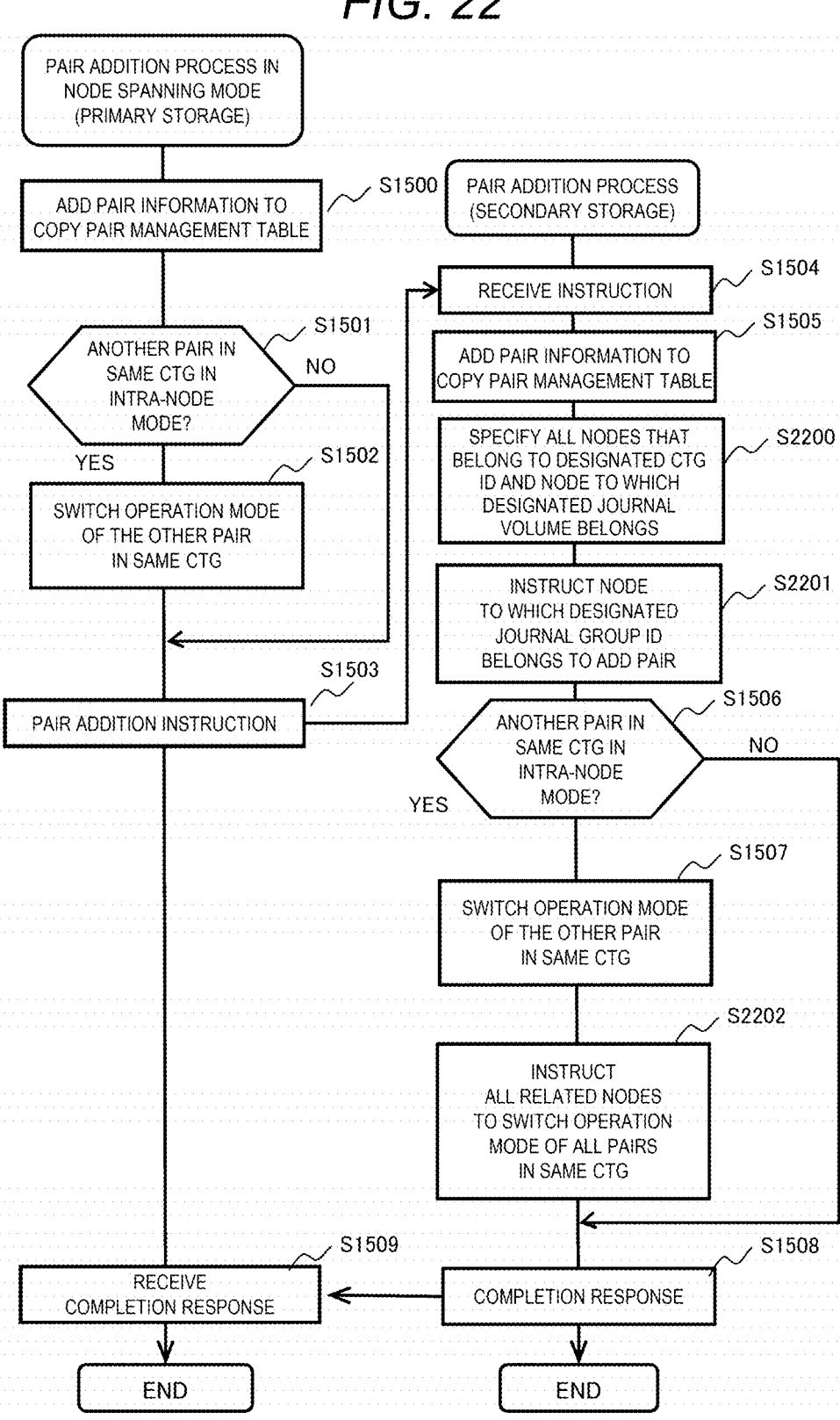
FIG. 22 is a flowchart of a pair addition process in a node spanning mode according to the second embodiment.

FIG. 22 is a flowchart of the pair addition process in the node spanning mode according to the second embodiment. In FIG. 22, steps similar to the pair addition process in the node spanning mode according to the first embodiment shown in FIG. 15 are denoted by the same reference signs. In the second embodiment, the processes of steps S1504, S1505, S1506, S1507, S1508 are executed by a representative storage node (representative node) of the storage nodes 102.

The copy pair management program 504 of the representative node refers to the volume management table 507, and specifies all storage nodes that belong to CTG having the designated CTG ID and a storage node to which a journal volume having the designated secondary journal ID belongs (S2200).

Next, the copy pair management program 504 of the representative node instructs a storage node in which the designated journal volume exists to add a record of the copy pair to the copy pair management table 506 of the storage node (S2201).

The copy pair management program 504 of the representative node issues, to all storage nodes to which copy pairs in the same CTG belong, an instruction to rewrite the operation mode 609 of an existing pair in the copy pair management table 506 in the storage node from intra-node to node spanning (S2202).

According to the computer system of the second embodiment, in the secondary storage system, the representative storage node executes a process of notifying the other storage nodes of various types of information, and thus the primary storage system can execute a process without taking into account a configuration of the secondary storage node.

Third Embodiment

Next, a computer system according to a third embodiment will be described. Here, in the present embodiment, basically, a portion different from the computer system according to the second embodiment will be described. Functional components similar to those of the computer system according to the first embodiment will be described using the same reference signs.

In the computer system according to the third embodiment, the storage system 101 in the second embodiment operates as a primary storage system (first storage system), and the storage system 100 operates as a secondary storage system (second storage system). In the present embodiment, the storage node 102 of the storage system 101 further stores a program (write order management program 403 or the like) required as a primary program of programs of the storage node 111, and the storage node 111 stores a program (data reflection arbitration program 503 or the like) required as a secondary program of programs of the storage node 102.

Next, a write order management process in the computer system 10 will be described.

Figure 23:
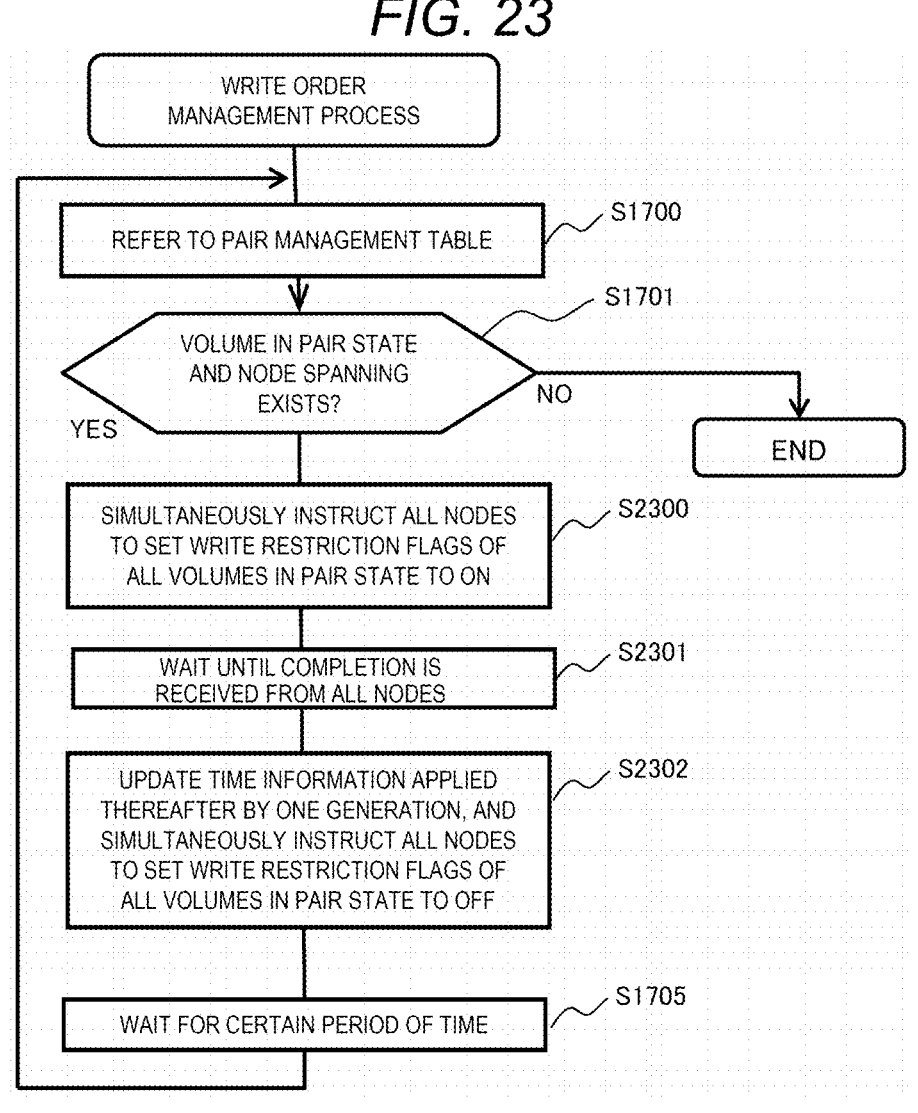
FIG. 23 is a flowchart of a write order management process according to a third embodiment.

FIG. 23 is a flowchart of the write order management process according to the third embodiment. In FIG. 23, steps similar to the write order management process according to the first embodiment shown in FIG. 17 are denoted by the same reference signs. In the third embodiment, the processes of steps S1700, S1701, and S1705 are executed by a representative storage node (representative node) of the storage nodes 102.

In order to set the write I/O restriction flag 906 in the volume management table 507 to ON for all copy pairs operating in the node spanning mode, the write order management program 403 of the representative node simultaneously issues an instruction to all storage nodes having volumes that are the copy pair to set the write I/O restriction flag to ON (S2300). As a result, the storage node having the volume to be the copy pair receives the instruction, sets the write I/O restriction flag 906 of the entry corresponding to the corresponding volume in the volume management table 507 to ON, and transmits completion of the setting to the representative node.

The write order management program 403 of the representative node waits until the write order management program 403 receives completion from all storage nodes 102 that the write order management program 403 issues the instruction to (S2301). When the completion is received from all storage nodes 102, the write order management program 403 increases a set value of time information applied at the time of adding the journal by 1 (updates one generation), and simultaneously instructs the storage nodes to set the write I/O restriction flag 906 of a record corresponding to a volume that is the copy pair in the volume management table 507 to OFF (S2302). Accordingly, in the following, this set value is applied to a write process in each storage node.

Fourth Embodiment

Next, a computer system according to a fourth embodiment will be described. Here, in the present embodiment, basically, a portion different from the computer system according to the third embodiment will be described. Functional components similar to those of the computer system according to the first embodiment will be described using the same reference signs.

The computer system according to the fourth embodiment is an example in which, in the computer system according to the third embodiment, the secondary management terminal 108 executes a part of a process when performing a copy pair operation to the storage system 101.

In the present embodiment, when a pair is created, the secondary management terminal 108 holds information equivalent to the copy pair management table 506 in the memory 202, and executes a similar process as the write order management process shown in FIG. 23.

Here, although the storage system 101 includes a plurality of storage nodes 102, the storage system has only one ID, and therefore is treated as one node by the secondary management terminal 108. Therefore, the secondary management terminal 108 cannot execute a process that takes into account a plurality of storage nodes, as in step S2300, and an instruction is sent to the one storage node.

Therefore, in the present embodiment, when a certain storage node receives an instruction from the secondary management terminal 108, the received instruction is transferred to a representative node, and the representative node refers to information in the copy pair management table 506 and the volume management table 507 to specify a storage node position to which a volume belongs, transfers the instruction to a storage note, and collects completion responses obtained from each storage node. Next, the representative node instructs the storage node that receives the instruction from the secondary management terminal 108 to respond with a completion response to the secondary management terminal 108.

According to such a process, from the secondary management terminal 108, similar control is possible whether a primary storage system is the storage system 100 or the storage system 101 including a plurality of nodes.

Fifth Embodiment

Next, a computer system according to a fifth embodiment will be described. Here, in the present embodiment, basically, a portion different from the computer system according to the first embodiment will be described. Functional components similar to those of the computer system according to the first embodiment will be described using the same reference signs.

The present embodiment further includes multiple device management terminals connected to both a primary storage system and a secondary storage system and having a function of managing a plurality of storage systems. The multiple device management terminals collect and utilize operation information and the like from a plurality of storage systems to execute processes such as determining volume allocation to efficiently use resources such as a CPU and capacity while maintaining a recovery point objective (RPO) designated by a user.

For example, when write order control is executed spanning a plurality of storage nodes, the RPO increases because journal data for a time that is not common to all journals and does not arrive is not reflected in a secondary volume. In the present embodiment, volume allocation capable of increasing resource utilization efficiency while maintaining the RPO designated by a user is performed.

Figure 24:
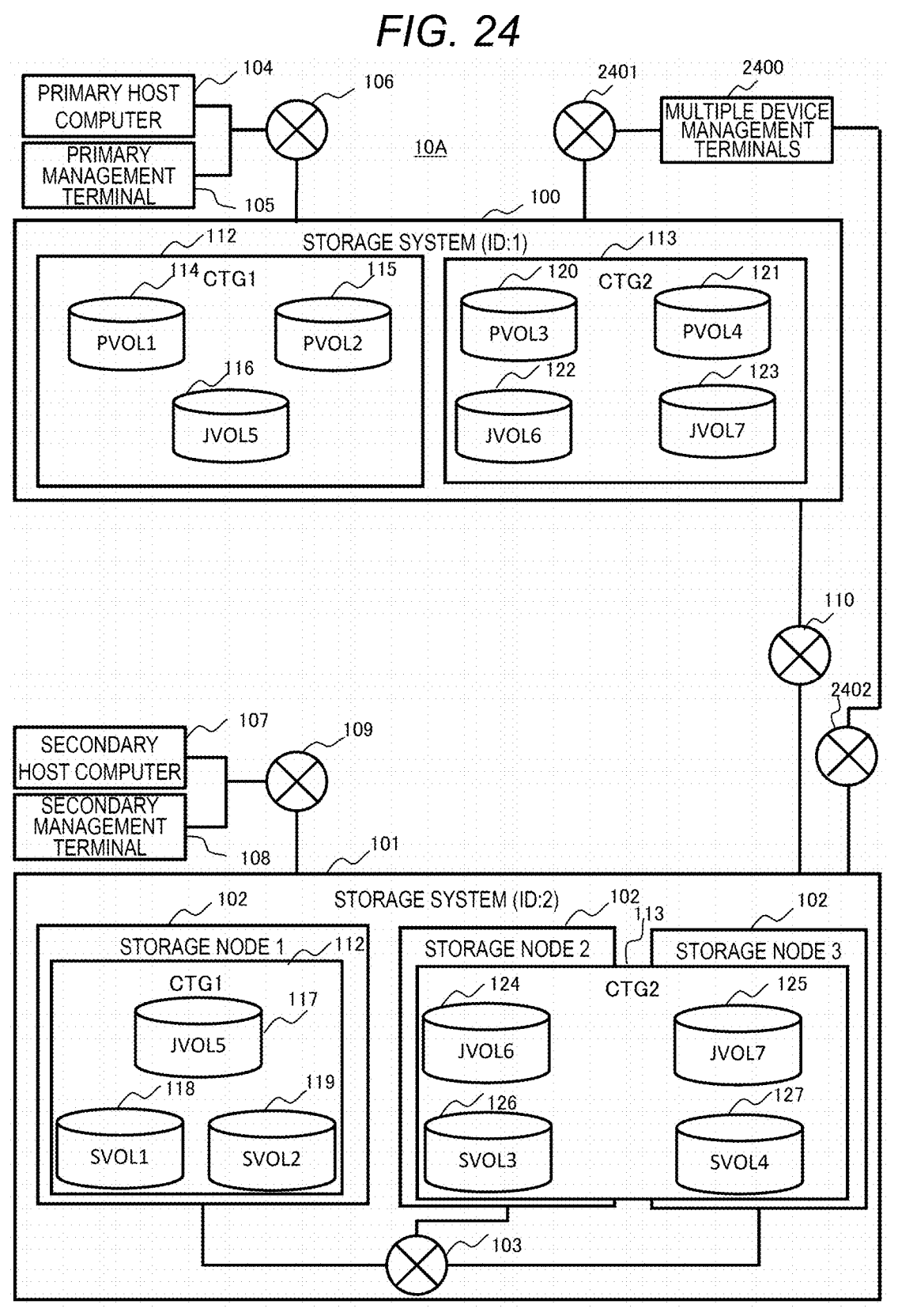

FIG. 24 is an overall configuration diagram of the computer system according to the fifth embodiment.

A computer system 10A further includes multiple device management terminals 2400 in the computer system 10. The multiple device management terminals 2400 are connected to the storage system 100 via a network 2401, and are connected to the storage system 101 via a network 2402. The multiple device management terminals 2400 are an example of a management device, and may have a hardware structure shown in FIG. 3 or a virtual machine on a cloud.

FIG. 25 is a configuration diagram of the memory of the multiple device management terminals according to the fifth embodiment.

The memory 202 of the multiple device management terminals 2400 includes an operation information collection program 2500, a service level maintenance program 2501, an optimum pair creation program 2502, a copy pair management table 2503, a volume management table 2504, a service level information table 2505, and an operation information table 2506.

The operation information collection program 2500 is executed by the CPU 201 to periodically collect operation information such as a CPU operation rate in each system from the storage system 100 and the storage system 101, and store operation information in the operation information table 2506.

The service level maintenance program 2501 is executed by the CPU 201 to store an index such as the RPO designated by a user in the service level information table 2505, and executes a process of periodically checking whether the index is satisfied and notifying the user an alert when the index is not satisfied.

The optimum pair creation program 2502 is executed by the CPU 201 to receive an instruction from a user to create a copy pair, determine volume allocation of a remote copy pair so as to maximize utilization of resources such as the CPU while maintaining a designated service level, and instruct the storage system 100 and the storage system 101 to create a volume or a copy pair.

The copy pair management table 2503 holds information related to a copy pair of the storage systems 100 and 101. The copy pair management table 2503 has records similar to those of the copy pair management table 406 and the copy pair management table 506.

The volume management table 2504 holds information related to volumes of the storage systems 100 and 101. The volume management table 2504 has records similar to those of the volume management table 407 and the volume management table 507.

The service level information table 2505 holds service level indexes such as the RPO designated by the user. The operation information table 2506 holds operation information such as CPU operation rates of the storage systems 100 and 101. Details of the service level information table 2505 and the operation information table 2506 will be described later.

Next, the operation information table 2506 will be described in detail.

FIG. 26 is a configuration diagram of the operation information table according to the fifth embodiment.

The operation information table 2506 is a table for managing operation information and stores records for each storage node. The record of the operation information table 2506 includes fields, which are a system ID 2600, a node ID 2601, a time 2602, a CPU operation rate 2603, and a usable capacity 2604.

The system ID 2600 stores an ID of a storage system to which a storage node corresponding to an entry belongs. The node ID 2601 stores a node ID of a storage node corresponding to the entry. The storage system 100 has a plurality of storage nodes for redundancy, and in the storage system 100, a plurality of nodes operate as one storage node, so that no node ID is set in the node ID 2601.

The time 2602 stores a time when operation information of a storage node corresponding to the entry is acquired. The CPU operation rate 2603 stores an CPU operation rate in the storage node corresponding to the entry. The usable capacity 2604 stores a remaining usable capacity in the storage node corresponding to the entry.

The operation information is held in its own memory 202 in each storage node and can be acquired from these storage nodes. The operation information is not limited to the CPU operation rate, and may be, for example, Input/Output Operations Per Second (IOPS).

According to a second record of the operation information table 2506, the storage node 102 (storage node 1) having a node ID of 1 in the storage system 101 having a system ID of 2 has a CPU operation rate of 45% and a usable capacity of 10 TB at 10:00.

Next, the service level information table 2505 will be described in detail.

FIG. 27 is a configuration diagram of the service level information table according to the fifth embodiment.

The service level information table 2505 is a table for managing a service level for volumes, and stores a record for each volume. The record of the service level information table 2505 includes fields, which are a system ID 2700, a volume ID 2701, an RPO 2702, and a maximum capacity 2703.

The system ID 2700 stores an ID of a storage system to which a volume corresponding to an entry belongs. The volume ID 2701 stores an ID of the volume corresponding to the entry. The RPO 2702 stores a value of an index indicating an allowable extent of rewinding of data at the time of failure for the volume corresponding to the entry can be permitted. The maximum capacity 2703 stores a maximum capacity that can be used by the volume corresponding to the entry.

According to a first record of the service level information table 2505, a volume having a volume ID of 1 in the storage system 100 having a system ID of 1 allows rewinding of the data at the time of the failure for one minute, and has a maximum capacity of 500 GB.

Next, an optimal pair creation process of creating a copy pair between the storage system 100 and the storage system 101 by the multiple device management terminals 2400 will be described.

FIG. 28 is a flowchart of the optimal pair creation process according to the fifth embodiment.

Here, it is assumed that, when executing the optimal pair creation process, the primary management terminal 105 transmits a pair creation instruction (a CTG ID which is a range in which a write order is guaranteed, a system ID of a primary storage system, a primary volume ID, and a system ID of the secondary storage system 101) to the multiple device management terminals 2400, for example, according to an instruction of a user.

The optimum pair creation program 2502 (strictly speaking, the CPU 201 that executes the optimum pair creation program 2502) of the multiple device management terminals 2400 receives a pair creation instruction from the primary management terminal 105 (S2800).

Next, the optimum pair creation program 2502 refers to the copy pair management table 2503, the volume management table 2504, and the service level information table 2505, and selects a node that satisfies a service level of a volume designated as a primary side and maximizes resource utilization efficiency of the secondary storage system (S2801). Typically, the optimum pair creation program 2502 first selects whether the operation mode 609 is intra-node or node spanning from the copy pair management table 2503 so as to satisfy an index value of the RPO 2702.

For example, if the index value of the RPO 2702 is short, allocation of intra-node is essential, so that a storage node that manages a volume with intra-node is provisionally determined as a candidate for an allocation destination by using a storage node in which a secondary volume is allocated. Here, if the usable capacity of the usable capacity 2604 of the candidate storage node is equal to or larger than a maximum capacity of the maximum capacity 2703 of a primary volume, the candidate storage node is determined as a volume allocation destination, and if the usable capacity is less than the maximum capacity, allocation is not possible, and the process ends with an error.

On the other hand, if the index value of the RPO 2702 is long, node spanning can be selected, so that all nodes in the secondary storage system are considered as candidates to narrow down a volume allocation destination and determine whether allocation is possible. For example, it is determined whether the usable capacity of the usable capacity 2604 is equal to or larger than the maximum capacity of the maximum capacity 2703 and whether a storage node is capable of storing a volume, and when there are a plurality of storage nodes capable of storing a volume, the CPU operation rate of the CPU operation rate 2603 is referred to, and a storage node having the most spare capacity is determined as the allocation destination.

Next, the optimum pair creation program 2502 creates a secondary volume based on the determined allocation, and executes a pair volume creation process (see FIG. 29) for creating a journal volume as necessary (S2802).

Next, the optimum pair creation program 2502 determines whether to form a pair in the same intra-node mode based on a result of the volume allocation in step S2801 (S2803). As a result, in a case of pair addition in the same intra-node mode (if true, S2803: YES), the optimum pair creation program 2502 advances the process to step S2804, and in the case of the node spanning mode (if false, S2803: NO), the optimum pair creation program 2502 advances the process to step S2805.

In step S2804, the optimum pair creation program 2502 instructs the primary storage system to execute a pair addition process in the same intra-node mode. Accordingly, the primary storage system that receives the instruction executes the pair addition process in the same intra-node mode shown in FIG. 14.

In step S2805, the optimum pair creation program 2502 instructs the primary storage system to execute a pair addition process in the node spanning mode. Accordingly, the primary storage system that receives the instruction executes the pair addition process in the node spanning mode shown in FIG. 15.

Next, the pair volume creation process (S2802) will be described in detail.

FIG. 29 is a flowchart of the pair volume creation process according to the fifth embodiment.

The optimum pair creation program 2502 refers to the copy pair management table 2503, and acquires information on all records (S2900). Next, the optimum pair creation program 2502 determines whether a designated CTG ID matches an existing CTG ID of a copy pair (S2901).

As a result, if the designated CTG ID and the existing CTG ID match (if true, S2901: YES), the optimum pair creation program 2502 advances the process to step S2902, and on the other hand, if the designated CTG ID and the existing CTG ID do not match (if false, S2901: NO), the optimum pair creation program 2502 advances the process to step S2905.

In step S2902, the optimum pair creation program 2502 instructs a secondary storage system to create a pair volume by designating a storage node. Accordingly, the secondary storage system that receives the instruction creates a pair volume by executing a similar process as in step S1204.

Next, the optimum pair creation program 2502 determines whether a journal volume having a secondary journal ID related to the designated CTG ID exists in a storage node in which a volume is to be created (S2903). As a result, if a journal volume having a secondary journal ID related to the designated CTG ID exists (if true, S2903: YES), the optimum pair creation program 2502 ends the process, and on the other hand, if a journal volume having a secondary journal ID related to the designated CTG ID does not exist (if false, S2903: NO), the optimum pair creation program 2502 advances the process to S2904.

In step S2904, the optimum pair creation program 2502 designates a storage node and transmits a journal volume creation instruction to the secondary storage system. Accordingly, the secondary storage system that receives the instruction creates a journal volume by executing a similar process as in step S1206.

In step S2905, the optimum pair creation program 2502 instructs the secondary storage system to create a pair volume similar as in step S2902. Accordingly, the secondary storage system that receives the instruction creates a pair volume by executing a similar process as in step S1204.

Next, the optimum pair creation program 2502 instructs the secondary storage system to create a journal volume as in step S2904 (S2906). Accordingly, the secondary storage system that receives the instruction creates a journal volume by executing a similar process as in step S1206. Thereafter, the optimum pair creation program 2502 ends the process.

The invention is not limited to the above-described embodiment, and can be appropriately modified and implemented without departing from the gist of the invention.

For example, in the above embodiments, a part or all of the process executed by a processor may be executed by a hardware circuit. The programs in the above embodiments may be installed from a program source. The program source may be a program distribution server or a recording medium (for example, a portable recording medium).

What is claimed is:

1. A computer system comprising:
   a first storage system; and
   a second storage system,
   wherein the first storage system manages a plurality of first volumes that belong to a consistency group that guarantees a write order of data,
   wherein the second storage system has a plurality of storage nodes,
   wherein the second storage system creates a plurality of second volumes as copy destinations of the plurality of first volumes in a distributed manner in the plurality of storage nodes, and causes a second journal volume to exist in each of the plurality of storage nodes in which the plurality of second volumes are created, the second journal volume storing journal data indicating write contents in the first volume as a copy source of the second volume,
   wherein the second storage system creates a second volume as a copy destination of the first volume in any one of the storage nodes, and when the second journal volume storing the journal data indicating the write contents in the first volume as the copy source of the second volume does not exist in the storage node, creates the second journal volume, and wherein the first storage system:

creates a plurality of first journal volumes storing journal data for the plurality of first volumes each corresponding to the second journal volume, executes a write order guarantee process of controlling a process for the plurality of first volumes so that the journal data indicating the write contents to the plurality of first volumes is stored in the plurality of first journal volumes while an order of writing to the plurality of first journal volumes is ensured, determines whether the plurality of second volumes as the copy destinations of the plurality of first volumes are generated in one of the storage nodes in the second storage system or is generated in the plurality of storage nodes, and when the plurality of second volumes are generated in the plurality of storage nodes, prepares a first journal volume corresponding to the second journal volume generated in the plurality of storage nodes, and executes the write order guarantee process when the plurality of second volumes as the copy destinations of the plurality of first volumes are generated in the plurality of storage nodes in the second storage system.

2. The computer system according to claim 1, wherein the first storage system receives identification information on a consistency group storing a volume to be copied and identification information on the first volume to be copied, and executes a process of creating the second volume as a copy destination of the first volume of the received consistency group.

3. The computer system according to claim 1, wherein the second storage system determines one of the storage nodes for creating the second volume from the plurality of storage nodes based on a number of volumes in the storage node or a remaining capacity of the storage node.

4. The computer system according to claim 1, further comprising:

a management device, wherein the management device determines a storage node in which the second volume is allocated based on a recovery point objective for the first volume.

5. A computer system comprising:

a first storage system; and a second storage system, wherein the first storage system manages a plurality of first volumes that belong to a consistency group that guarantees a write order of data, wherein the second storage system has a plurality of storage nodes and creates a plurality of second volumes as copy destinations of the plurality of first volumes in a distributed manner in the plurality of storage nodes, and causes a second journal volume to exist in each of the plurality of storage nodes in which the plurality of second volumes are created, the second journal volume storing journal data indicating write contents in the first volume as a copy source of the second volume, and wherein the first storage system:

creates a plurality of first journal volumes storing journal data for the plurality of first volumes each corresponding to the second journal volume, and executes a write order guarantee process of controlling a process for the plurality of first volumes so that the journal data indicating the write contents to the plurality of first volumes is stored in the plurality of first journal volumes while an order of writing to the plurality of first journal volumes is ensured, wherein the write order guarantee process includes a process of preventing a write process for the plurality of first volumes when updating time information to be applied to the journal data, a storage unit that stores restriction information indicating whether to prevent a write process for a plurality of volumes when time information is updated, wherein the first storage system refers to the restriction information and determines whether to prevent the write process for the volume when updating the time information.

6. The computer system according to claim 5, wherein the first storage system has a plurality of storage nodes that operate independently, and one of the storage nodes in the first storage system instructs all of the other storage nodes to prevent the write process for the plurality of first volumes when updating the time information to be applied to the journal data.

7. A remote copy control method performed by a computer system including a first storage system and a second storage system, wherein the second storage system has a plurality of storage nodes, wherein the first storage system manages a plurality of first volumes that belong to a consistency group that guarantees a write order of data, wherein the method comprises:

creating, by the second storage system, a plurality of second volumes as copy destinations of the plurality of first volumes in a distributed manner in the plurality of storage nodes, and causing, by the second storage system, a second journal volume to exist in each of the plurality of storage nodes in which the plurality of second volumes are created, the second journal volume storing journal data indicating write contents in the first volume as a copy source of the second volume, and creating, by the first storage system, a plurality of first journal volumes storing journal data for the plurality of first volumes each corresponding to the second journal volume, executing, by the first storage system, a write order guarantee process of controlling a process for the plurality of first volumes so that the journal data indicating the write contents to the plurality of first volumes is stored in the plurality of first journal volumes while an order of writing to the plurality of first journal volumes is ensured, determining, by the first storage system, whether the plurality of second volumes as the copy destinations of the plurality of first volumes are generated in one of the storage nodes in the second storage system or is generated in the plurality of storage nodes, and when the plurality of second volumes are generated in the plurality of storage nodes, prepares a first journal volume corresponding to the second journal volume generated in the plurality of storage nodes, and executing, by the first storage system, the write order guarantee process when the plurality of second volumes as the copy destinations of the plurality of first volumes are generated in the plurality of storage nodes in the second storage system, creating, by the second storage system, a second volume as a copy destination of the first volume in any one of the storage nodes, and creating, by the second storage system, the second journal volume when the second journal volume storing the journal data indicating the write contents in the first volume as the copy source of the second volume does not exist in the storage node.

\* \* \* \* \*